US010933316B1

(12) United States Patent
Scholler et al.

(10) Patent No.: US 10,933,316 B1
(45) Date of Patent: Mar. 2, 2021

(54) OBJECT TRACK FOR PHYSICAL INTERACTION AND VIRTUALIZATION, AND PHYSICAL OBJECT DETECTION AND VIRTUALIZATION

(71) Applicant: c/o Tangible Play, Inc., Palo Alto, CA (US)

(72) Inventors: Jerome Scholler, San Francisco, CA (US); Arnaud Brejeon, Yorba Linda, CA (US); Andrew Berwald, Palo Alto, CA (US); Mark Solomon, Palo Alto, CA (US)

(73) Assignee: Tangible Play, Inc., Palo Alto, CA (US)

( * ) Notice: Subject to any disclaimer, the term of this patent is extended or adjusted under 35 U.S.C. 154(b) by 7 days.

(21) Appl. No.: 15/953,213

(22) Filed: Apr. 13, 2018

Related U.S. Application Data

(60) Provisional application No. 62/564,150, filed on Sep. 27, 2017, provisional application No. 62/484,906, filed on Apr. 13, 2017.

(51) Int. Cl.
*A63F 13/803* (2014.01)
*A63F 13/245* (2014.01)
*A63F 13/98* (2014.01)
*A63F 13/65* (2014.01)

(52) U.S. Cl.
CPC ............ *A63F 13/245* (2014.09); *A63F 13/65* (2014.09); *A63F 13/803* (2014.09); *A63F 13/98* (2014.09)

(58) Field of Classification Search
CPC ........ A63F 13/52; A63F 13/245; A63F 13/65; A63F 13/803; A63F 13/908
See application file for complete search history.

(56) References Cited

U.S. PATENT DOCUMENTS

| 9,898,871 | B1 * | 2/2018 | Reagan | ................ G06T 19/006 |
| 10,478,723 | B2 * | 11/2019 | Scott | ........................ G06F 3/017 |
| 2015/0209664 | A1 * | 7/2015 | Haseltine | ................ G06F 3/011 463/31 |
| 2016/0381171 | A1 * | 12/2016 | Anderson | ............... H04L 67/22 709/217 |

* cited by examiner

*Primary Examiner* — Omkar A Deodhar
*Assistant Examiner* — Ross A Williams
(74) *Attorney, Agent, or Firm* — Patent Law Works LLP

(57) ABSTRACT

An example method for virtualizing physical objects into a virtual environment includes capturing a video stream of a racing field component, displaying a graphical user interface embodying a virtual game, detecting a placement of a physical vehicle at a starting portion of a channel of the racing field component, identifying one or more characteristics of the physical vehicle at the starting portion, generating a virtual vehicle representation of the physical vehicle using the one or more characteristics of the physical vehicle, and displaying the virtual vehicle representation of the physical vehicle.

20 Claims, 24 Drawing Sheets

OBJECT TRACK FOR PHYSICAL INTERACTION AND VIRTUALIZATION, AND PHYSICAL OBJECT DETECTION AND VIRTUALIZATION

CROSS-REFERENCE TO RELATED APPLICATIONS

The present application claims the benefit under 35 U.S.C. § 119(e) of U.S. Provisional Patent Application Ser. No. 62/564,150, entitled "Object Track for Physical Interaction and Virtualization, and Physical Object Detection and Virtualization," filed on Sep. 27, 2017, the entire contents of which are incorporated herein by reference. The present application also claims the benefit under 35 U.S.C. § 119(e) of U.S. Provisional Patent Application Ser. No. 62/484,906, entitled "Inserting Physical Objects Into Virtual Environment," filed on Apr. 13, 2017, the entire contents of which are incorporated herein by reference.

BACKGROUND

The present disclosure relates to physical object interaction and virtualization.

A tangible user interface is a physical environment that a user can physically interact with to manipulate digital information. While tangible user interfaces have opened up a new range of possibilities for interacting with digital information, significant challenges remain when implementing such an interface. For instance, existing tangible user interfaces generally require expensive, high-quality sensors to digitize user interactions with this environment, which results in systems incorporating these tangible user interfaces being too expensive for most consumers. In addition, these existing systems are often difficult to setup and use, which has led to limited customer use and adoption.

Input devices have been used to interact with virtual games presenting digital information on a display. The input devices are used to provide inputs and directions to the virtual game. For instance, existing methods of providing input to a virtual game include handheld controllers. Handheld controllers are physical components that a user may use to create inputs to control the virtual game. Handheld controllers include both simple input types including buttons and joysticks, as well as motion sensing controllers that include accelerometers and positioning sensors to detect rotations and movement inputs. A user may enter inputs into the handheld controller to control a virtual game.

However significant challenges remain when implementing these handheld controllers. For instance, handheld controllers are not intuitive and require users to learn how the controllers are mapped out in order to provide inputs. Furthermore, handheld controllers are not passive objects that users use for reasons other than controlling video games, but rather, handheld controllers are dedicated objects designed just for controlling video games. As such, user's imaginations and creativity are not sparked when using conventional video game controllers. Users both derive value out of their interactions with the controllers themselves as well as use them to provide inputs and interactions to affect the events on the virtual screen.

Motion sensing controllers exist that allow a user to provide inputs through motion rather than buttons, etc. Motion sensing controllers are also limited in the way input can be presented and require specific motion inputs that are often difficult for the sensors to capture, resulting in a disconnect between what command a user is attempting to input and an interpretation of the input by the sensors.

One input systems that offers more intuitive inputs is a motion capture sensor that includes a camera configured to view a portion of a room and capture gestures and inputs from a user. These input systems allow a user to control a virtual game using gestures and motion. These motion capture sensors include many additional limitations, such as the complex setup process, the high cost to include the input system, and the limited amount of interactions that a user can present. Furthermore, many of the actions required for input in the motion capture sensor require specific gestures that often do not have any relation to the virtual game. When a broad range of users execute the specific gestures, deviations in the way the gesture is executed may cause the motion capture sensor to not identify the gesture. Motion capture sensors also do not incorporate objects detected within the portion of the room but instead rely only on the gestures and actions of a user.

SUMMARY

According to one innovative aspect of the subject matter in this disclosure, a method for detecting a physical object and executing a virtual vehicle representation in a virtual game is described. In an example implementation, a method including: capturing, using a video capture device, a video stream of a physical scene including a racing field component having a track extending from a starting portion to an end portion; displaying, on a display, a graphical user interface embodying a virtual game; detecting, in the video stream, a placement of a physical vehicle in the starting portion of the track of the racing field component; identifying, using a processor of a computing device, one or more characteristics of the physical vehicle; generating, using the processor of the computing device, a virtual vehicle representation of the physical vehicle using the one or more characteristics of the physical vehicle; and displaying, on the display of the computing device, the virtual vehicle representation of the physical vehicle. Other embodiments of this aspect include corresponding computer systems, apparatus, and computer programs recorded on one or more computer storage devices, each configured to perform the actions of the methods.

Implementations may include one or more of the following features. The method further including: detecting, in the video stream, a token placed in the physical scene; identifying a virtual action based on one or more characteristics of the token; and executing the virtual action in the virtual game. The method where executing the virtual action in the virtual game includes changing a virtual movement of the virtual vehicle representation in the virtual game. The method where the virtual action is one of a speed increase, a speed decrease, a lane change, a jump, and an attack. The method further includes: detecting, using the processor of the computing device, a first quantity of visual cue surface that is depicted in the video stream at a first time; determining a first sound based on the first quantity of the visual cue surface that is depicted; and emitting, using an audio reproduction device, the first sound. The method further including: detecting, using the processor of the computing device, a second quantity of the visual cue surface that is depicted in the video stream at a second time; determining a second sound based on the second quantity of the visual cue surface that is depicted; and emitting, using an audio reproduction device, the second sound. The method where. The method may also include the track is a first track. The method may also include the starting portion is a first starting portion. The method may also include the end portion is a first end portion. The method may also include the placement is a first placement. The method may also include the physical vehicle is a first physical vehicle. The method may also include the virtual vehicle representation is a first virtual vehicle representation. The method may also include the video stream of the physical scene includes a second track extending from a second starting portion to a second end portion, and the method further includes: detecting, in the video stream, a second placement of a second physical vehicle in the second starting portion of the second track. The method may also include identifying, using the processor of the computing device, one or more characteristics of the second physical vehicle at the second starting portion. The method may also include generating, using the processor of the computing device, a second virtual vehicle representation of the second physical vehicle using the one or more characteristics of the second physical vehicle. The method may also include displaying, on the display of the computing device, the second virtual vehicle representation of the second physical vehicle in the graphical user interface of the virtual game, the second virtual vehicle representation displayed adjacent to the first virtual vehicle representation. The method where the first physical vehicle is different from the second physical vehicle and the method further includes: associating, using the processor of the computing device, the first physical vehicle with a first user of the virtual game and the second physical vehicle with a second user of the virtual game. The method further including: displaying, in the graphical user interface of the virtual game, a starting prompt; detecting, a first movement of the first physical vehicle responsive to the starting prompt being displayed, the first movement of the first physical vehicle caused by a first vehicle retaining mechanism releasing the first physical vehicle from the first starting portion; detecting, a second movement of the second physical vehicle responsive to the starting prompt being displayed, the second movement of the second physical vehicle caused by a second vehicle retaining mechanism releasing the second physical vehicle releasing from the second starting portion; determining, using the processor of the computing device, whether the first movement and the second movement are within a start release period; and executing, in the graphical user interface of the virtual game, a first starting action associated with the first virtual vehicle representation and a second starting action associated with the second virtual vehicle representation based on the determination of whether the first movement and the second movement are within the start release period. Implementations of the described techniques may include hardware, a method or process, or computer software on a computer-accessible medium.

One general aspect includes a method including: retaining a physical vehicle within a starting portion of a track using a vehicle retaining mechanism; releasing the physical vehicle from the starting portion down the track responsive to an engagement of a trigger coupled to the vehicle retaining mechanism; detecting, using a video capture device, the release of the physical vehicle from the starting portion down the track; and updating a virtual scene displayed via a display device to reflect the release of the physical vehicle from the starting portion. Other embodiments of this aspect include corresponding apparatuses, each configured to perform the actions of the methods.

Implementations may include one or more of the following features. The method further including: receiving a placement of the physical vehicle in the starting portion of the track. The method further including: detecting, using the video capture device, a partial activation of the trigger by an extremity of a user; and emitting a sound reflecting an upcoming release of the physical vehicle from the starting portion down the track based on the detected partial activation of the trigger. The method where detecting the partial activation of the trigger further includes: detecting, using the video capture device, a quantity of visual cue surface depicted on the vehicle retaining mechanism; and determining that the quantity of visual cue surface depicted satisfies a condition of the partial activation of the trigger. The method further including: receiving a placement of a token in a designated area within a field of view of the video capture device; detecting, using the video capture device, the placement of the token in the designated area; identifying a virtual action based on the token; and updating the virtual scene displayed via the display device to reflect an execution the virtual action. The method may also include the physical vehicle is a first physical vehicle. The method may also include the starting portion of the track is a first starting portion of a first track. The method may also include the vehicle retaining mechanism is a first vehicle retaining mechanism. The method may also include the trigger is a first trigger, and the method further includes: retaining a second physical vehicle within a second starting portion of a second track using a second vehicle retaining mechanism. The method may also include releasing the second physical vehicle from the second starting portion down the second track responsive to an engagement of a second trigger coupled to the second vehicle retaining mechanism. The method may also include detecting, using the video capture device, the release of the second physical vehicle from the second starting position down the second track. The method may also include updating the virtual scene displayed via the display device to reflect the release of the second physical vehicle from the second starting position. Implementations of the described techniques may include hardware, a method or process, or computer software on a computer-accessible medium.

One general aspect includes a vehicle virtualization toy, including: a first vehicle track extending from a starting portion to an end portion; a first vehicle retaining mechanism that retains a first physical vehicle in a starting position in the starting portion of the first vehicle track; a first vehicle release trigger coupled to the first vehicle retaining mechanism and engageable to release the first vehicle retaining mechanism and thereby deploy the first vehicle; and a computing device support portion situated proximate the end portion of the first vehicle track to support a computing device having a display and a camera, the computing device being supported by the computing device support portion and the camera of the computing device being positioned to capture the first vehicle track and the first vehicle retaining mechanism. Other embodiments of this aspect include corresponding computer systems, apparatus, and computer programs recorded on one or more computer storage devices, each configured to perform the actions of the methods.

Implementations may include one or more of the following features. The vehicle virtualization toy further including: a mirror placeable on the computing device to redirect a field of view of the camera to capture the first vehicle track and the first vehicle retaining mechanism. The vehicle virtualization toy where the computing device support portion includes a first interface on a top surface of the computing device support portion, the first interface configured to engage with a corresponding second interface on a bottom of a computing device stand, the first interface and the second interface, when engaged, aligning and retaining the computing device stand on the computing device support portion. The vehicle virtualization toy where the computing device support portion includes a computing device stand that retains the computing device and positions a display of the computing device for viewing by a user while interacting with the vehicle virtualization toy. The vehicle virtualization toy where the vehicle retaining mechanism includes a visual cue surface located on a surface of the vehicle retaining mechanism and within a field of view of the camera. The vehicle virtualization toy further including: an elongated platform including the track and a token holder having a cavity for holding a plurality of tokens. The vehicle virtualization toy where the token holder is connected to the platform via a hinge and is configured to pivot about the hinge between an open position and a closed position. The vehicle virtualization toy further including: a door attached via a hinge mechanism at the end portion of the first vehicle track, the door closable via the hinge mechanism and block the first vehicle track at the end portion of the track. The vehicle virtualization toy where. The vehicle virtualization toy may also include the first vehicle track includes an intermediate portion between the starting portion and the end portion. The vehicle virtualization toy may also include the vehicle virtualization toy further includes a designated interaction area including the intermediate portion of the first vehicle track, the designated interaction area including a distinct texture that is detectable by the camera, and the designated interaction area representing a portion of the vehicle virtualization toy where a token may be placed. The vehicle virtualization toy further including: a first token placeable by a first user proximate to the first vehicle track; a second token placeable by a second user proximate to a second vehicle track; and an application executable by the computing device to detect a placement of the first token by a first user and a placement of the second token by the second user and execute virtual actions in a virtual game responsive to the placement of the first token and the placement of the second token. The vehicle virtualization toy where. The vehicle virtualization toy may also include the starting portion is a first starting portion. The vehicle virtualization toy may also include the end portion is a first ending portion, and the vehicle virtualization toy further includes: the vehicle virtualization toy may also include a second vehicle track extending from a second starting portion to a second ending portion. The vehicle virtualization toy may also include a second vehicle retaining mechanism that retains a second physical vehicle in the second starting portion of the second vehicle track. The vehicle virtualization toy may also include a second vehicle release trigger coupled to the second vehicle retaining mechanism and engageable to release the second vehicle retaining mechanism and thereby deploy the second vehicle. Implementations of the described techniques may include hardware, a method or process, or computer software on a computer-accessible medium Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
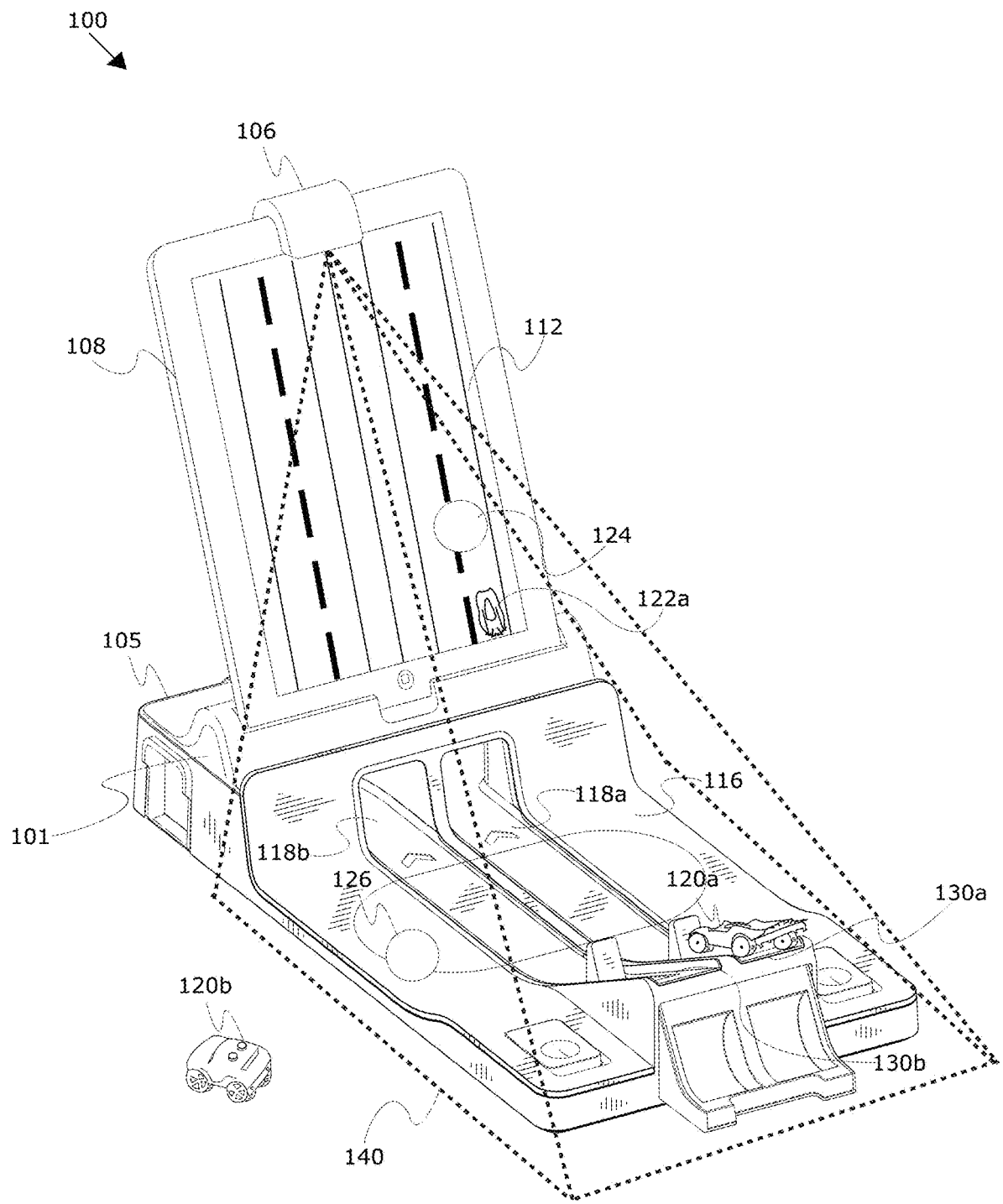
FIG. 1 depicts an example configuration for virtualized interaction with tangible objects including a computing device and an interaction platform.

The technology described herein provides platform virtualizing physical objects into a virtual environment. FIG. 1 depicts an example configuration 100 of an example interaction platform 116. For example, some more particular embodiments, as shown in FIG. 1, relate to a racing game in which a player may launch a physical vehicle 120 down a track 118 of an object deployment device represented as an interaction platform 116 to generate a virtual vehicle representation 122 of that vehicle and present the virtual vehicle representation 122 within a virtual game displayed on a display 112 that is visible to a player.

In some implementations, the racing game may include a single track 118, while in further implementations, the racing game may include two or more tracks 118. For example, the racing game may include more than one player, in which case multiple players (e.g., two or more) may place physical vehicles 120a and 120b on starting portions 130 of adjacent tracks 118 and launch their physical vehicles 120 down their respective tracks 118. A computing device 108 may be positioned on a stand 105 and include a capture device (not shown), such as a camera or video capture device, covered by an adapter 106 to direct a field of view 140 of the capture device towards the interaction platform 116 to capture the physical vehicles 120 on the track 118, or may include a camera positioned to capture the track(s) 118. The computing device 108 may include activity application (s) 214 (not shown) that can virtualize the physical vehicle 120 and include the virtualization of the physical vehicle in the gameplay. For example, the game may include virtual vehicle representations 122 of the physical vehicles 120 that may be included in the virtual game displayed on the display 112.

In some implementations, the virtual game displayed on the display 112 will continue to represent the virtual vehicle representation 122 in the virtual game even after the physical vehicle 120 has exited the field of view 140 of the capture device. In some implementations, the virtual game may present one or more virtual objective(s) 124 in the display 112 and a user may interact with the virtual game using the interaction platform 116.

In some implementations, a user may place a token 126 on the interaction platform 116, and based on the type of token 126 detected by the capture device, an action may be performed in the virtual game. For example, a user may place a "speed token" depicted by token 126 and the virtual game may increase the speed/rate at which the virtual game displays the virtual vehicle representation 122 moving on the display 112. In a further example, the virtual game may present a virtual objective 124 in a different lane and the user may place a "switch lane" token depicted by token 126 on the interaction platform 116 in order to cause the virtual vehicle representation 122 to switch lanes to the lane the virtual objective 124 is present in. In some implementations, the token 126 may include a unique visual indicator representing a specific type of action. In further implementations, each token 126 may include unique markings that are distinguishable from other tokens 126, a certain number of times, or upon certain condition(s) such that a detection engine 212 (not shown) may only allow each token 126 to be used once during a virtual game.

As depicted, the configuration 100 may include tangible interface objects, such as physical vehicle(s) 120 and/or token(s) 126, that may be provided (e.g., drawn, created, molded, built, projected, placed, etc.) onto and/or adjacent to the interaction platform 116, as well as a computing device 108 that is equipped or otherwise coupled to a capture device (not shown) configured to capture a video stream of the interaction platform 116. The computing device 108 includes novel software and/or hardware capable of displaying the virtual vehicle representation 122 of the tangible interface objects, as well as processing the video to detect an interaction between a user and the tangible interface objects (used elsewhere herein as the physical vehicle 120 and/or the token 126).

In some implementations, the interaction platform 116 may be preconfigured for certain activities. For example, the interaction platform 116 may be a racing field component or a vehicle virtualization toy that facilitates the racing game example describe elsewhere herein. However, other implementations using alternative tangible objects other than physical vehicles, such as balls, marbles, blocks, etc. are also contemplated. The interaction platform 116 may have built in triggers and/or specific locations for placement of tangible objects that may be incorporated directly into the interaction platform 116.

In some implementations, the computing device 108 may be situated on a surface proximate to the interaction platform 116, while in further implementations, (as shown in FIG. 1) the computing device 108 may rest in a stand 105 that is configured to be placed onto a portion of the interaction platform 116. The computing device 108 can provide the user(s) with a virtual portal for displaying virtual vehicle representation 122 and interacting with the racing game. Example computing devices 108 may include, but are not limited to, mobile phones (e.g., feature phones, smart phones, etc.), tablets, laptops, desktops, netbooks, TVs, set-top boxes, media streaming devices, portable media players, navigation devices, personal digital assistants, etc.

The computing device 108 includes or is otherwise coupled (e.g., via a wireless or wired connection) to a camera 110 (also referred to herein as a capture device or a video capture device, not shown) for capturing a video stream of the interaction platform 116. As depicted in FIG. 1, the capture device may be a front-facing camera that is equipped with an adapter 106 that adapts the field of view 140 of the camera to include, at least in part, a portion of the interaction platform 116.

As depicted in FIG. 1, the computing device 108 and/or the camera 110 may be positioned and/or supported by a stand 105. For instance, the stand 105 may position the display 112 of the computing device 108 in a position that is optimal for viewing and interaction by the user who is simultaneously interacting with the physical environment (interaction platform 116). The stand 105 may be configured to rest on a stand support 101 of the interaction platform 116 and in some implementations the stand 105 and the interaction platform 116 may be able to uniquely couple together or may be integrated as described elsewhere herein to receive and sturdily hold the computing device 108 so the computing device 108 remains stable during use, and/or position the display of the computing device 108 so the user can interact with the display and the components of the interaction platform 116.

In some implementations, the adapter 106 adapts a capture device (e.g., front-facing, rear-facing camera) of the computing device 108 to capture substantially only the interaction platform 116, although numerous further implementations are also possible and contemplated. For instance, the adapter 106 can split the field of view 140 of the front-facing camera into two scenes. In this example with two scenes, the capture device captures a interaction platform 116 that includes a portion of the activity surface and is able to capture tangible interface objects in either portion of the interaction platform 116. In another example, the adapter 106 can redirect a rear-facing camera of the computing device (not shown) toward a front-side of the computing device 108 to capture the interaction platform 116 located in front of the computing device 108. In some implementations, the adapter 106 can define one or more sides of the scene being captured (e.g., top, left, right, with bottom open). In further implementations, the adapter 106 can redirect a field of view 140 of a camera 110 separate from the computing device 108.

The adapter 106 and stand 105 for a computing device 108 may include a retaining mechanism, such as but not limited to a slot for retaining (e.g., receiving, securing, gripping, etc.) an edge of the computing device 108 to cover at least a portion of the capture device. The adapter 106 may include at least one optical element (e.g., a mirror) to direct the field of view 140 of the capture device toward the interaction platform 116.

In some implementations, the computing device 108 may be placed in and received by a compatibly sized slot formed in a top side of the stand 105. The slot may extend at least partially downward into a main body of the stand 105 at an angle so that when the computing device 108 is secured in the slot, it is angled back for convenient viewing and utilization by its user or users. The stand 105 may include a channel formed perpendicular to and intersecting with the slot. The channel may be configured to receive and secure the adapter 106 when not in use. For example, the adapter 106 may have a tapered shape that is compatible with and configured to be easily placeable in the channel of the stand 105. In some instances, the channel may magnetically secure the adapter 106 in place to prevent the adapter 106 from being easily jarred out of the channel. The stand 105 may be elongated along a horizontal axis to prevent the computing device 108 from tipping over when resting on a substantially horizontal activity surface (e.g., a table). The stand 105 may include channeling for a cable that plugs into the computing device 108. The cable may be configured to provide power to the computing device 108 and/or may serve as a communication link to other computing devices, such as a laptop or other personal computer.

In some implementations, the adapter 106 may include one or more optical elements, such as mirrors and/or lenses, to adapt the standard field of view 140 of the capture device. For instance, the adapter 106 may include one or more mirrors and lenses to redirect and/or modify the light being reflected from the interaction platform 116 into the capture device. As an example, the adapter 106 may include a mirror angled to redirect the light reflected from the interaction platform 116 in front of the computing device 108 into a front-facing camera of the computing device 108. As a further example, many wireless handheld devices include a front-facing camera with a fixed line of sight with respect to the display 112. The adapter 106 can be detachably connected to the device over the camera to augment the line of sight of the camera so it can capture the surface (e.g., surface of a table) that includes the interaction platform 116. The mirrors and/or lenses in some implementations can be polished or laser quality glass. In other examples, the mirrors and/or lenses may include a first surface that is a reflective element. The first surface can be a coating/thin film capable of redirecting light without having to pass through the glass of a mirror and/or lens. In an alternative example, a first surface of the mirrors and/or lenses may be a coating/thin film and a second surface may be a reflective element. In this example, the lights passes through the coating twice, however since the coating is extremely thin relative to the glass, the distortive effect is reduced in comparison to a conventional mirror. This reduces the distortive effect of a conventional mirror in a cost effective way.

In another example, the adapter 106 may include a series of optical elements (e.g., mirrors) that wrap light reflected off of the interaction platform 116 located in front of the computing device 108 into a rear-facing camera of the computing device 108 so it can be captured. The adapter 106 could also adapt a portion of the field of view 140 of the capture device (e.g., the front-facing camera) and leave a remaining portion of the field of view 140 unaltered so that multiple scenes may be captured by the capture device as shown in FIG. 1. The adapter 106 could also include optical element(s) that are configured to provide different effects, such as enabling the capture device to capture a greater portion of the interaction platform 116. For example, the adapter 106 may include a convex mirror that provides a fisheye effect to capture a larger portion of the interaction platform 116 and/or surrounding area than would otherwise be capturable by a standard configuration of the capture device.

The capture device could, in some implementations, be an independent unit that is distinct from the computing device 108 and may be positionable to capture the interaction platform 116 or may be adapted by the adapter 106 to capture the interaction platform 116 as discussed above. In these implementations, the capture device may be communicatively coupled via a wired or wireless connection to the computing device 108 to provide it with the video stream being captured.

Figure 2:
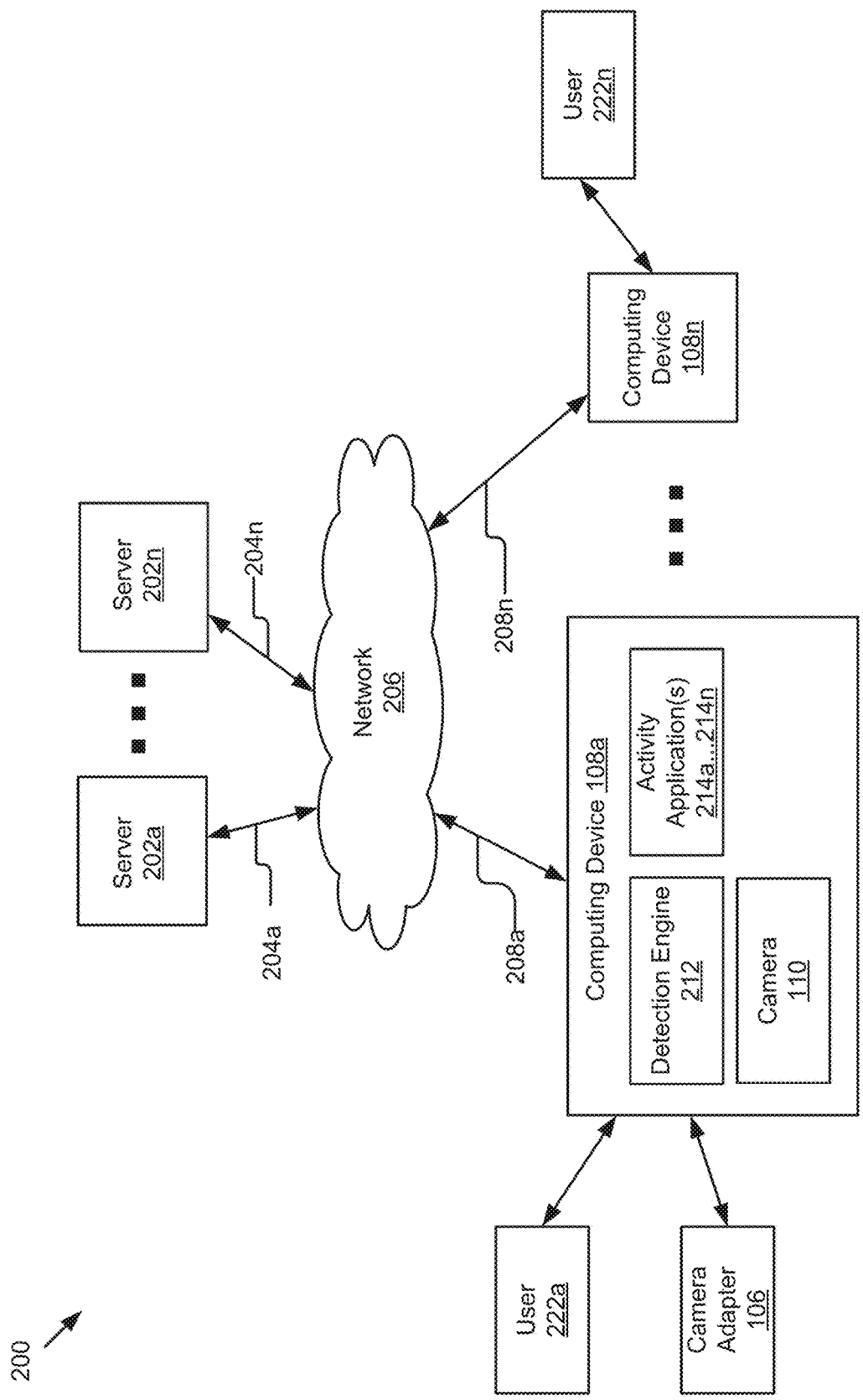
FIG. 2 is a block diagram illustrating an example computer system for virtualized interaction with tangible objects.

FIG. 2 is a block diagram illustrating an example computer system 200 for virtualizing physical object(s) 120 for a virtual environment. The illustrated system 200 includes computing devices 108a . . . 108n (also referred to individually and collectively as 108) and servers 202a . . . 202n (also referred to individually and collectively as 202), which are communicatively coupled via a network 206 for interaction with one another. For example, the computing devices 108a . . . 108n may be respectively coupled to the network 206 via signal lines 208a . . . 208n and may be accessed by users 222a . . . 222n (also referred to individually and collectively as 222). The servers 202a . . . 202n may be coupled to the network 206 via signal lines 204a . . . 204n, respectively. The use of the nomenclature "a" and "n" in the reference numbers indicates that any number of those elements having that nomenclature may be included in the system 200.

The network 206 may include any number of networks and/or network types. For example, the network 206 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The computing devices 108a . . . 108n (also referred to individually and collectively as 108) are computing devices having data processing and communication capabilities. For instance, a computing device 108 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.). The computing devices 108a . . . 108n may couple to and communicate with one another and the other entities of the system 200 via the network 206 using a wireless and/or wired connection. While two or more computing devices 108 are depicted in FIG. 2, the system 200 may include any number of computing devices 108. In addition, the computing devices 108a . . . 108n may be the same or different types of computing devices.

As depicted in FIG. 2, one or more of the computing devices 108a . . . 108n may include a capture device depicted as a camera 110, a detection engine 212, and activity application(s) 214. One or more of the computing devices 108 and/or cameras 110 may also be equipped with an adapter 106 as discussed elsewhere herein. The detection engine 212 is capable of detecting and/or recognizing tangible interface objects, such as a physical vehicle 120 and/or token 126 in/on the interaction platform 116 (e.g., on the activity surface within field of view 140 of camera 110). The detection engine 212 can detect the position and orientation of the tangible interface objects in physical space, detect how the tangible interface objects are being manipulated by the user 222, and cooperate with the activity application(s) 214 to provide users 222 with a rich virtual experience by executing a virtual vehicle representation 122 in a virtual scene on the display 112 (not shown).

In some implementations, the detection engine 212 processes video captured by a camera 110 to detect a physical vehicle 120 and/or token 126 and executes a virtual response in a virtual game as described elsewhere herein. The activity application(s) 214 are capable of generating a virtualization, such as virtual vehicle representations 122 based on the physical vehicles 120 in the virtual game. Additional structure and functionality of the computing devices 108 are described in further detail below with reference to at least FIG. 3.

The servers 202 may each include one or more computing devices having data processing, storing, and communication capabilities. For example, the servers 202 may include one or more hardware servers, server arrays, storage devices and/or systems, etc., and/or may be centralized or distributed/cloud-based. In some implementations, the servers 202 may include one or more virtual servers, which operate in a host server environment and access the physical hardware of the host server including, for example, a processor, memory, storage, network interfaces, etc., via an abstraction layer (e.g., a virtual machine manager).

The servers 202 may include software applications operable by one or more computer processors of the servers 202 to provide various computing functionalities, services, and/or resources, and to send data to and receive data from the computing devices 108. For example, the software applications may provide functionality for internet searching; social networking; web-based email; blogging; micro-blogging; photo management; video, music and multimedia hosting, distribution, and sharing; business services; news and media distribution; user account management; or any combination of the foregoing services. It should be understood that the servers 202 are not limited to providing the above-noted services and may include other network-accessible services.

It should be understood that the system 200 illustrated in FIG. 2 is provided by way of example, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200 may be integrated into a single computing device or system or additional computing devices or systems, etc.

Figure 3:
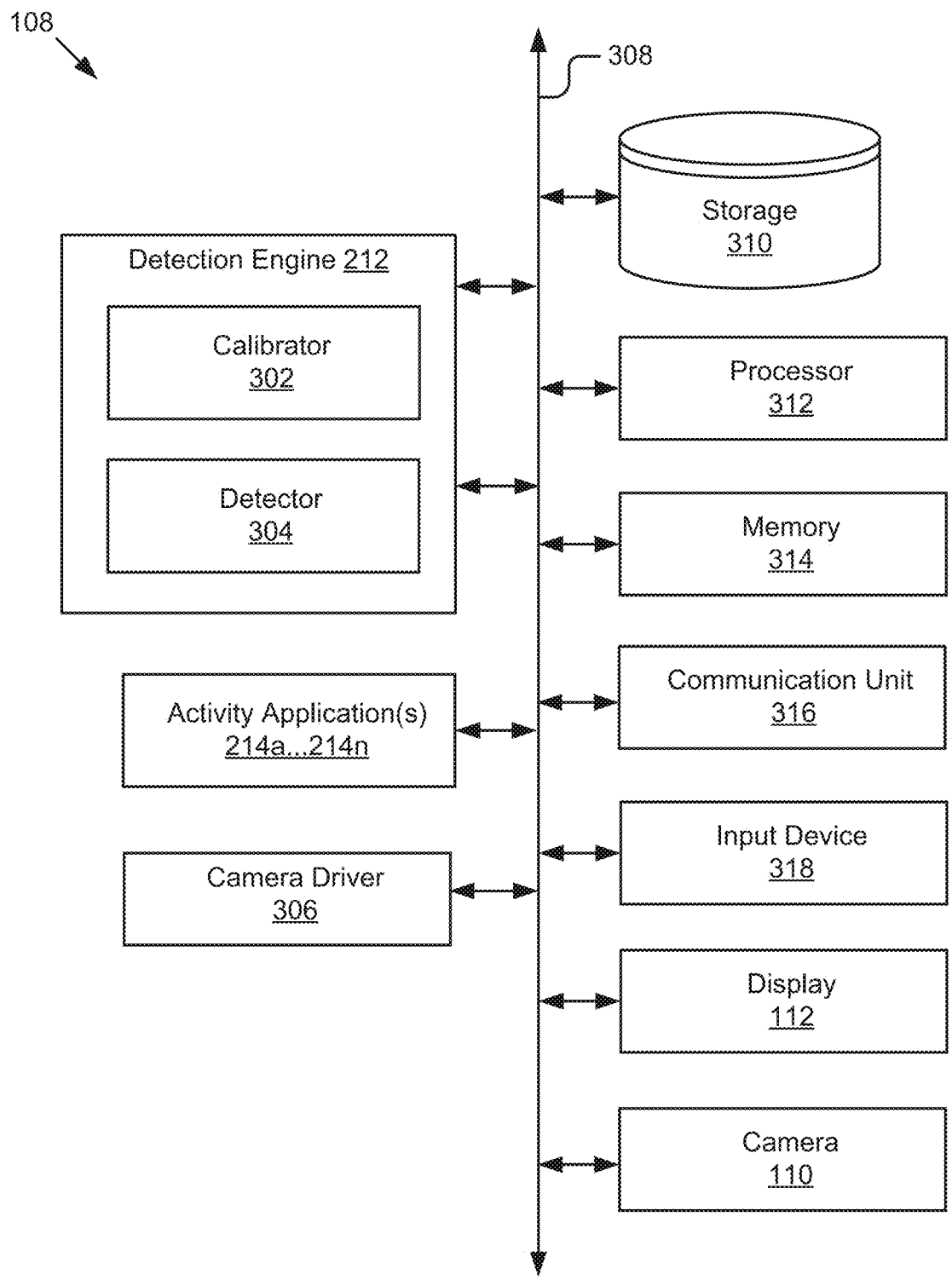
FIG. 3 is a block diagram illustrating an example computing device.

FIG. 3 is a block diagram of an example computing device 108. As depicted, the computing device 108 may include a processor 312, memory 314, communication unit 316, display 112, camera 110, and an input device 318, which are communicatively coupled by a communications bus 308. However, it should be understood that the computing device 108 is not limited to such and may include other elements, including, for example, those discussed with reference to the computing devices 108 in FIGS. 1 and 2.

The processor 312 may execute software instructions by performing various input/output, logical, and/or mathematical operations. The processor 312 has various computing architectures to process data signals including, for example, a complex instruction set computer (CISC) architecture, a reduced instruction set computer (RISC) architecture, and/or an architecture implementing a combination of instruction sets. The processor 312 may be physical and/or virtual, and may include a single core or plurality of processing units and/or cores.

The memory 314 is a non-transitory computer-readable medium that is configured to store and provide access to data to the other elements of the computing device 108. In some implementations, the memory 314 may store instructions and/or data that may be executed by the processor 312. For example, the memory 314 may store the detection engine 212, the activity application(s) 214, and the camera driver 306. The memory 314 is also capable of storing other instructions and data, including, for example, an operating system, hardware drivers, other software applications, data, etc. The memory 314 may be coupled to the bus 308 for communication with the processor 312 and the other elements of the computing device 108.

The communication unit 316 may include one or more interface devices (I/F) for wired and/or wireless connectivity with the network 206 and/or other devices. In some implementations, the communication unit 316 may include transceivers for sending and receiving wireless signals. For instance, the communication unit 316 may include radio transceivers for communication with the network 206 and for communication with nearby devices using close-proximity (e.g., Bluetooth®, NFC, etc.) connectivity. In some implementations, the communication unit 316 may include ports for wired connectivity with other devices. For example, the communication unit 316 may include a CAT-5 interface, Thunderbolt™ interface, FireWire™ interface, USB interface, etc.

The display 112 may display electronic images and data output by the computing device 108 for presentation to a user 222. The display 112 may include any conventional display device, monitor or screen, including, for example, an organic light-emitting diode (OLED) display, a liquid crystal display (LCD), etc. In some implementations, the display 112 may be a touch-screen display capable of receiving input from one or more fingers of a user 222. For example, the display 112 may be a capacitive touch-screen display capable of detecting and interpreting multiple points of contact with the display surface. In some implementations, the computing device 108 may include a graphics adapter (not shown) for rendering and outputting the images and data for presentation on display 112. The graphics adapter (not shown) may be a separate processing device including a separate processor and memory (not shown) or may be integrated with the processor 312 and memory 314.

The input device 318 may include any device for inputting information into the computing device 108. In some implementations, the input device 318 may include one or more peripheral devices. For example, the input device 318 may include a keyboard (e.g., a QWERTY keyboard), a pointing device (e.g., a mouse or touchpad), microphone, a camera, etc. In some implementations, the input device 318 may include a touch-screen display capable of receiving input from the one or more fingers of the user 222. For instance, the functionality of the input device 318 and the display 112 may be integrated, and a user 222 of the computing device 108 may interact with the computing device 108 by contacting a surface of the display 112 using one or more fingers. In this example, the user 222 could interact with an emulated (i.e., virtual or soft) keyboard displayed on the touch-screen display 112 by using fingers to contact the display 112 in the keyboard regions.

The detection engine 212 may include a calibrator 302 and detector 304. The elements 212 and 304 may be communicatively coupled by the bus 308 and/or the processor 312 to one another and/or the other elements 214, 306, 310, 314, 316, 318, 112, and/or 110 of the computing device 108. In some implementations, one or more of the elements 212 and 304 are sets of instructions executable by the processor 312 to provide their functionality. In some implementations, one or more of the elements 212 and 304 are stored in the memory 314 of the computing device 108 and are accessible and executable by the processor 312 to provide their functionality. In any of the foregoing implementations, these components 212, and 304 may be adapted for cooperation and communication with the processor 312 and other elements of the computing device 108.

The calibrator 302 includes software and/or logic for processing the video stream captured by the camera 110 to detect calibration points. The calibration points may be sent to the processor 312 and/or the activity application(s) 214 and used to calibrate the video stream. In further implementations, the detector 304 may use the calibration points to correctly detect the tangible objects within the video stream. The calibration points may include specific visual indicators that are detectable by the calibrator 302 and/or the detector 304. The specific visual indicators may include markings and/or indentations along edges or other portions of the stand 105, interaction platform 116, and/or the adapter 106.

The detector 304 includes software and/or logic for processing the video stream captured by the camera 110 to detect movement of the physical vehicle 120 and/or token 126, position of the physical vehicle 120, entrance of the physical vehicle 120 into a tunnel of the interaction platform 116, and/or visual characteristics of the interaction platform 116. For example, the detector 304 may process the video to determine at which point players may place a physical vehicle 120 in the starting portion 130 of the track 118. In some implementations, the detector 304 may detect when the physical vehicle 120 moves into a tunnel of the interaction platform 116 and disappears from the field of view 140 of the camera 110.

In further implementations, the detector 304 may be configured to detect a hand of the user 222 and the position of the hand of the user 222 relative to a trigger or portion of the interaction platform 116. In some implementations, the detector 304 may detect the player's hand near the trigger, and as the player moves their hand and or fingers back/forth or up/down, the detector 304 may detect the movement and send the movement to the activity application(s) 214 for further processing, such as making a revving sound, etc. as described elsewhere herein.

In some implementations, the detector 304 may detect the first user 222 to push their trigger 408 to release their physical vehicle 120 and may communicate the detector information to the activity application(s) 214 to generate a virtualization, such as the virtual vehicle representation 122 of that player's physical vehicle 120 first in the gameplay of the virtual game on the display 112. In some implementations, the detector 304 may detect physical characteristics or ornamentation of the physical vehicle 120 and may communicate the physical characteristics or ornamentation to the activity application(s) 214 for the activity application(s) 214 to generate a virtualization that includes those physical characteristics or ornamentation, such as by including the physical characteristics or ornamentations on the virtual vehicle representation 122. In some implementations, the detector 304 may identify line segments related to tangible interface objects or characteristics of the interaction platform 116.

In some implementations, the detector 304 may be coupled to and receive the video stream from the camera 110, the camera driver 306, and/or the memory 314. In some implementations, the detector 304 may process the images of the video stream to determine positional information for the line segments related to the tangible interface objects and/or characteristics of the interaction platform 116 (e.g., location and/or orientation of the line segments in 2D or 3D space) and then analyze characteristics of the line segments included in the video stream to determine the identities and/or additional attributes of the line segments.

The detector 304 may recognize the line by identifying its contours. The detector 304 may also identify various attributes of the line, such as colors, contrasting colors, depth, texture, etc. In some implementations, the detector 304 may use the description of the line and the lines attributes to identify the objects (such as the physical vehicle(s) 120 and/or the tokens 126) by comparing the description and attributes to a database of objects and identifying the closest matches.

The detector 304 may be coupled to the storage 310 via the bus 308 to store, retrieve, and otherwise manipulate data stored therein. For example, the detector 304 may query the storage 310 for data matching any line segments that it has determined are present in the interaction platform 116. In the above descriptions, the detector 304 may send the detected images to the detection engine 212 and the detection engine 212 may perform the above described features.

The activity application(s) 214 include software and/or logic for receiving a detected information related to physical vehicles 120 and/or tokens 126 and executing a virtual vehicle representation 122 and other digital interactions in the virtual game. The activity application(s) 214 may be coupled to the detector 304 via the processor 312 and/or the bus 308 to receive the detected information. For example, a user 222 may place a physical vehicle 120 in the starting portion 130 and press a trigger on the interaction platform 116 to cause the physical vehicle 120 to roll down the track 118 and the activity application(s) 214 may determine that a virtual vehicle representation 122 can be displayed based on the timing and the movement of the physical vehicle 120, in the virtual game.

In some implementations, the activity application(s) 214 may determine the virtual vehicle representations 122 and other actions within the virtual game by searching through a database of virtual responses that are compatible with the detected information. In some implementations, the activity application(s) 214 may access a database of virtual responses stored in the storage 310 of the computing device 108. In further implementations, the activity application(s) 214 may access a server 202 to search for profiles of physical vehicles 120. In some implementations, a user 222 may predefine a profile to include in the database of vehicle profiles. For example, profiles for the different physical vehicles 120 may be stored in data storage, such as the storage 310, and the activity application(s) 214 may retrieve the vehicle profile from the data store. Each vehicle profile may define unique persona for the vehicle, such as unique audio and visual components for the vehicles that may be executed and/or rendered by the activity application(s) 214. Examples may include digital audio files (e.g., exhaust notes, or horn tones, driving noises, voices, etc.) for a physical vehicle 120, unique graphical images (e.g., views from different perspectives, in different environments, etc.), etc. In some implementations, the activity application(s) 214 may enhance the virtual game and/or the virtual vehicle representation 122. In some implementations, unique vehicle identification may be performed and applied to the virtual vehicle representation 122 by the activity application(s) 214, such as physical vehicle 120 shape and/or color, although other variations are also contemplated including pictorial representations, signatures, and/or other suitable recognizable artifacts.

The camera driver 306 includes software storable in the memory 314 and operable by the processor 312 to control/operate the camera 110. For example, the camera driver 306 is a software driver executable by the processor 312 for signaling the camera 110 to capture and provide a video stream and/or still image, etc. The camera driver 306 is capable of controlling various features of the camera 110 (e.g., flash, aperture, exposure, focal length, etc.). The camera driver 306 may be communicatively coupled to the camera 110 and the other components of the computing device 108 via the bus 308, and these components may interface with the camera driver 306 via the bus 308 to capture video and/or still images using the camera 110.

As discussed elsewhere herein, the camera 110 is a video capture device configured to capture video of at least the activity surface, including the interaction platform 116. The camera 110 may be coupled to the bus 308 for communication and interaction with the other elements of the computing device 108. The camera 110 may include a lens for gathering and focusing light, a photo sensor including pixel regions for capturing the focused light and a processor for generating image data based on signals provided by the pixel regions. The photo sensor may be any type of photo sensor including a charge-coupled device (CCD), a complementary metal-oxide-semiconductor (CMOS) sensor, a hybrid CCD/CMOS device, etc. The camera 110 may also include any conventional features such as a flash, a zoom lens, etc. The camera 110 may include a microphone (not shown) for capturing sound or may be coupled to a microphone included in another component of the computing device 108 and/or coupled directly to the bus 308. In some implementations, the processor of the camera 110 may be coupled via the bus 308 to store video and/or still image data in the memory 314 and/or provide the video and/or still image data to other elements of the computing device 108, such as the detection engine 212 and/or activity application(s) 214.

The storage 310 is an information source for storing and providing access to stored data, such as a database of vehicle profiles, virtual game instructions, token profiles, user profile information, community developed profiles, virtual enhancements, etc., object data, calibration data, and/or any other information generated, stored, and/or retrieved by the activity application(s) 214.

In some implementations, the storage 310 may be included in the memory 314 or another storage device coupled to the bus 308. In some implementations, the storage 310 may be or included in a distributed data store, such as a cloud-based computing and/or data storage system. In some implementations, the storage 310 may include a database management system (DBMS). For example, the DBMS could be a structured query language (SQL) DBMS. For instance, storage 310 may store data in an object-based data store or multi-dimensional tables comprised of rows and columns, and may manipulate, i.e., insert, query, update, and/or delete, data entries stored in the verification data store using programmatic operations (e.g., SQL queries and statements or a similar database manipulation library). Additional characteristics, structure, acts, and functionality of the storage 310 is discussed elsewhere herein.

Figure 4:
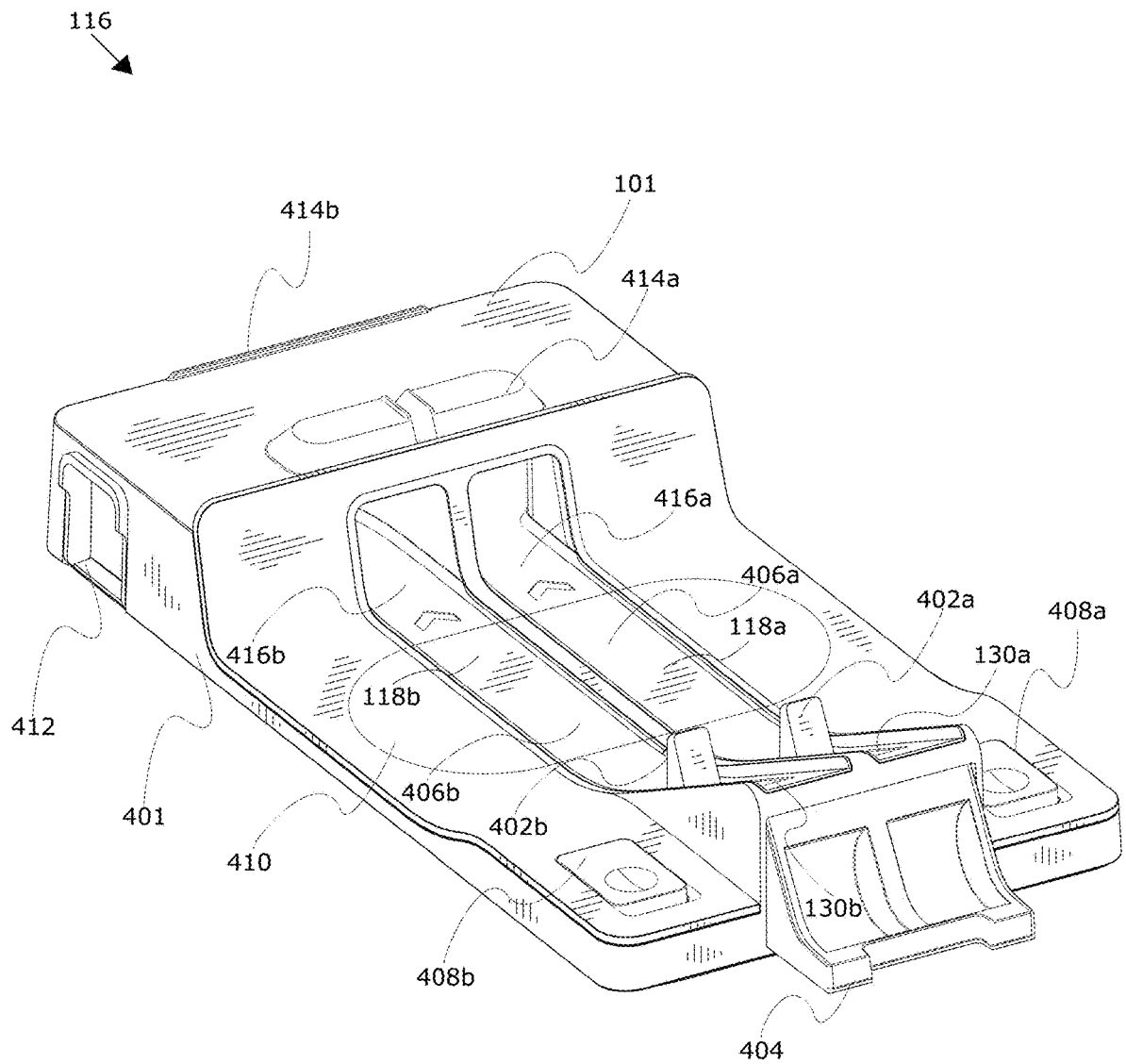
FIG. 4 depicts an example interaction platform.

FIG. 4 depicts an example interaction platform 116. In some implementations, the interaction platform 116 is a tangible component that tangible objects, such a physical vehicles 120 (not shown) and/or tokens 126 (not shown) may be positioned on and a capture device of a computing device 108 (not shown) may capture images and/or video of the tangible objects.

The interaction platform 116 comprises a body 401 that facilitates the positioning of tangible objects for capture by the capture device. In some implementations, the body 401 may include an area where a computing device 108 may be situated. In further implementations, the body 401 may be situated near the computing device 108, such that the field of view 140 of the capture device may be configured to capture at least a portion of the body 401. In some implementations, the body 401 may comprise a housing, base, framework, and/or other structure that includes or comprises the various components of the interaction platform 116.

In some implementations, the body 401 may include an area (e.g., surface, portion, etc.) where tangible objects, such as physical vehicle(s) 120 and/or token(s) 126, may be positioned and allow for the physical vehicle 120 to move. In some implementations, this area may include one or more track(s) 118. The track(s) 118 extend from one portion of the body 401 to another portion of the body 401 that allows for the physical vehicles 120 to move along predetermined paths.

The track 118 may be molded out of a top surface of the body 401, may be a separate attachable piece (such as a piece of plastic car track) that may attach and/or rest on the body 401, may be a flat area along which physical vehicles 120 may move on the body 401, may be inclined downward on the body 401, and/or a combination of inclined and flat track 118, and/or take other suitable forms. In further implementations, the track 118 may be contiguous and loop around, while in further implementations, the track 118 may be discontinuous.

In some implementations, the track(s) 118 may be formed into a top surface of the body 401. For example a recessed portion of a top surface of the body 401. The recessed portion(s) may comprise channel(s) included in the top surface of the interaction platform 116. In some implementations, the channel(s) may be sufficiently wide for physical vehicle(s) 120 to move through the channel unobstructed. In some implementations, the channel(s) may comprise raised sides from the top surface of the body, and/or extend downward into the top surface of the body 401, and serve as guides such that the physical vehicle 120 is retained within the track 118 as the physical vehicle(s) 120 move down the track(s) 118. The vehicle bearing guides may keep the physical vehicle 120 moving along the intended pathway of the track(s) 118. The surface(s) of the track(s) 118 between the guides may be smooth such that physical vehicle(s) 120 may travel along the surface with a lower amount of friction. In further implementations, the track surface may include wheel grooves and/or channels adapted to receive and/or guide one or more wheels (e.g., rotational components) of a physical vehicle(s) 120.

In some implementations, a track 118 includes one or more segments (also called portions) that make up the track 118, such as a starting portion 130, an intermediate portion 406, and/or an end portion 416. In some implementations, the starting portion 130 may be situated on an elevated and/or inclined portion of the track 118, such that the starting portion 130 is higher than the adjacent portions of the track, providing a ramp at a decline for a physical vehicle 120 to be deployed and/or launched from.

The starting portion 130 may include a mechanical retaining mechanism 402 positioned to hold a physical vehicle 120 in position until the retaining mechanism 402 is released. In some implementations, the retaining mechanism 402 may project out of the surface of the track 118 such that when a physical vehicle 120 is placed in the starting portion 130, a front end of the physical vehicle 120 rests against a side of the retaining mechanism 402. In further implementations, the retaining mechanism 402 may be a hook or a bar that raises or holds the physical vehicle 120 such that the physical vehicle 120 cannot roll down the track 118. Other suitable configurations for the retaining mechanism area also possible and contemplated.

In some implementations, the retaining mechanism 402 of a given track 118 may be mechanically and/or electrically linked to trigger 408, such that when trigger 408 is activated and/or depressed, the mechanical and/or electrical linkage connecting the trigger 408 to the retaining mechanism 402 releases the retaining mechanism 402 (e.g., lowers the retaining mechanism below the plane of the starting portion 130) to allow the physical vehicle 120 located in the starting portion 130 to be released down the track 118. The mechanical and/or electric linkage may include a series of plastic rods and levers that couple to the trigger 408 and the retaining mechanism 402 and cause an action (such as an activation, a press, a depression, etc.) being applied to the trigger 408 causes a force to be applied along the mechanical and/or electrical linkage and cause a releasing action at the retaining mechanism 402. In further implementations, as an action is removed from the trigger 408, the mechanical and/or electrical linkage may cause the releasing action to be removed from the retaining mechanism 402 and the retaining mechanism 402 may return to an original position.

The trigger 408 may be a pressable trigger situated on a surface and/or side of the body 401 of the interaction platform 116. In some implementations, the trigger 408 may include a spring mechanism, such that when the trigger 408 is depressed under pressure, the spring mechanism is compressed and exerts a force on the trigger 408 to return the trigger 408 to its original position as the pressure on the trigger 408 is removed.

In some implementations, the capture device may capture images of the physical vehicle(s) 120 as they are positioned in the starting portion 130, move out of the starting portion 130, and move down the intermediate portion 406, and into or along the end portion 416. For example, the capture device can capture a video stream and/or one or more pictures of the physical vehicle 120 traveling along any portion of the track (e.g., intermediate portion 406, starting portion 130, and/or end portion 416, etc.) In some implementations, the intermediate portion 406 may be relatively level and straight, while other implementations including incline or decline angled track portions, turns, twists, loops, etc., are contemplated.

In some implementations, the intermediate portion 406 can be partitioned by the detector 304 such that the activity application(s) 214 can calculate a speed of the physical vehicle 120 as the physical vehicle 120 travels along the starting portion 130 and/or intermediate portion 406. In some implementations, the activity application(s) 214 can calculate the speed by comparing a first position of the physical vehicle 120 in the starting portion 130 and/or the intermediate portion 406, with a second position of the physical vehicle 120 in the intermediate portion 406. The first position and the second position may be captured at specific time intervals to compare the traveled distance over the know time interval. In some implementations, the rate of travel along each portion may be determined. Other implementations are also possible and contemplated.

In some implementations, one or more segments of the track 118 (e.g., the starting portion 130, the intermediate portion 406, and/or the end portion 416) may include location markings (not shown) that the detector 304 can identify for determining the first position and the second position relative to known characteristics of the physical vehicle 120 identified by the detector 304 (such as the front of the physical vehicle 120, a marking on the middle of the physical vehicle 120, etc.).

In some implementations, the end portion 416 or a portion of the end portion 416, may be a portion of the track 118 beyond or obscured from the field of view 140 of the capture device. In the example shown in FIG. 4, the end portion 416 includes a stand support 101 forming an enclosure on which a computing device 108 may be situated and/or through which the track 118 may enter, such that the track runs under a computing device 108 situated on the stand support 101. In further implementations, the end portion 416 may be open on the top and the computing device 108 may be situated proximate to (e.g., behind) the body 401.

In some implementations, the stand support 101 forming the enclosure may include top and/or side surfaces that enclose the end portions 416. By allowing the physical vehicle 120 to travel directly under the stand support 101 where the computing device 108 rests, the capture device is afforded a direct line of travel by the physical vehicle 120 in the field of view 140 of the capture device as the physical vehicle 120 travels. The direct line of travel allows the detector 304 to avoid complicated calculations to correct skewing and angular changes that could result from the physical vehicle 120 traveling at an angle towards the computing device 108. However, other angles of capture are also contemplated, such as the track 118 coming in from the right or left side of the field of view 140 of the capture device and mathematical calculations can be performed to calculate speed and positions at those other angles of capture.

Figure 6A:
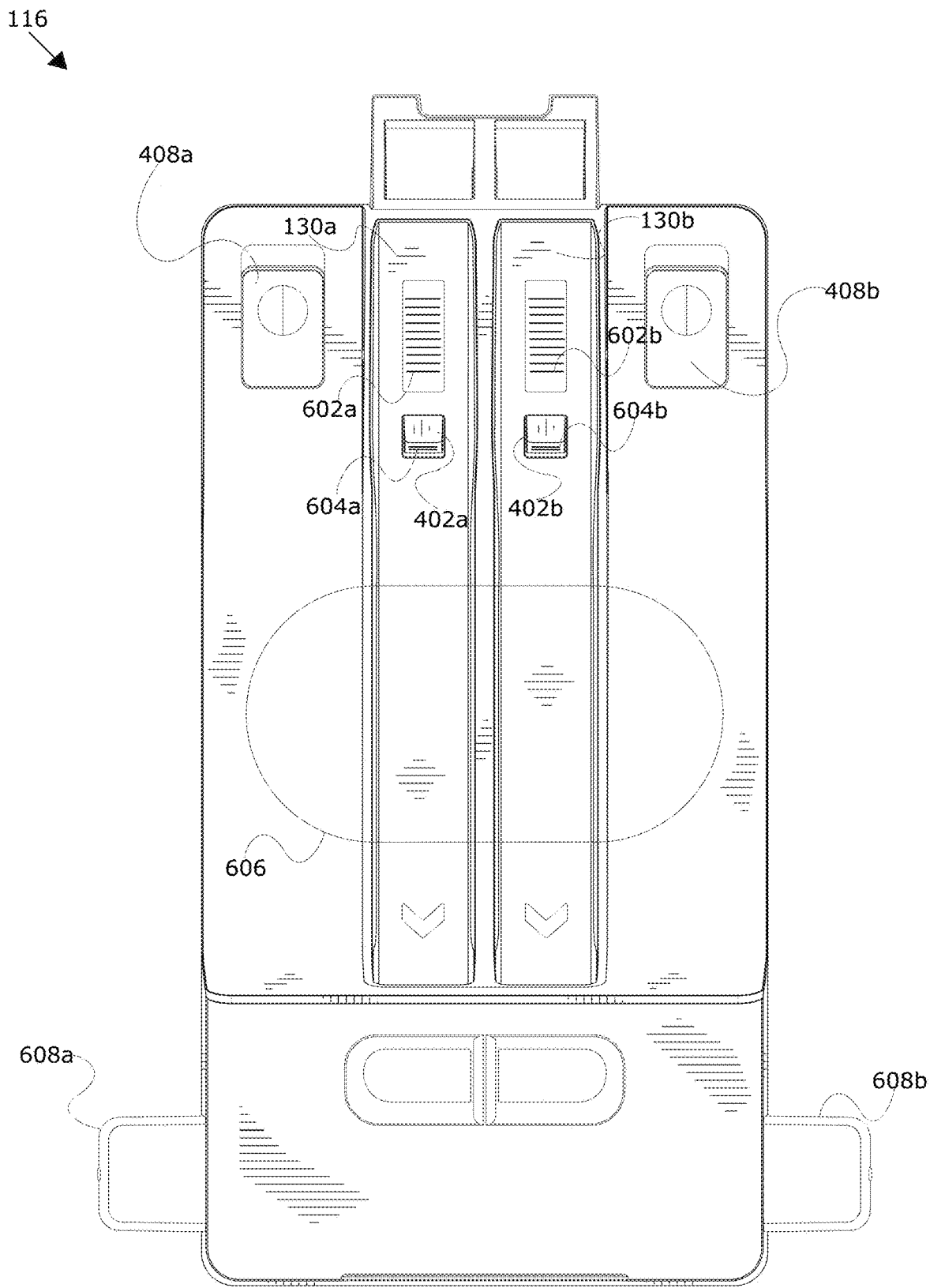
FIGS. 6A-6B depict an example configuration of the interaction platform.

In some implementations, the end portion 416 of the track 118 may include a tunnel exit 412. In some implementations, the end portion 416 may include one or more curves and/or other types of angles, such that the track 118 turns and a physical vehicle 120 exits the tunnel exit 412 on a left or right side of the interaction platform 116, rather than the rear of the interaction platform 116, although other directions of placement for the tunnel exit 412 are contemplated. The tunnel exit 412 may include a door to stop the movement of the physical vehicle 120, allowing the physical vehicle 120 to rest within the tunnel. In further implementations, the door may be a flip-down door that can be rotated in an up or down position as shown in FIG. 6A. The flip-down door provides the benefit of being attachable to the body 401 so that it is always present and may be able to stop the physical vehicles 120 from rolling off of the track 118 at the tunnel exit 412 and potentially being lost in the environment.

The stand support 101 may a top surface that includes one or more interfaces for coupling and/or engage with corresponding interfaces on a stand. In some implementations, the interface may include stand connectors 414 configured to receive and retain a stand 105 in place on the stand support 101. The stand connectors 414 may be projections that protrude out of the top surface of the stand support 101 and are configured to be situated within interface, such as gaps (not shown) in the stand 105 such that the stand 105 is held in place and aligned such the field of view 140 of the camera is directed to the interaction platform 116. In further implementations, the stand connectors 414 may include magnetic coupling components that couple to corresponding components within the stand 105 to secure the stand 105 to the stand support 101. In further implementations, the stand connectors 414 may include a channel (not shown) that a stand 105 may be configured to rest within, when the stand 105 is in use. In further implementations, the stand support 101 may be integrated into a stand 105 as a single unit, instead of two separate attachable pieces.

In some implementations, the interaction platform 116 may include a container (also referred to herein as a token holder) 404 that may be configured to store physical vehicles 120 and/or tokens 126. In some implementations, the container 404 may be integrated into a side or a top surface of the interaction platform 116. In some implementations, the container 404 may include a cavity for holding a plurality of tokens. For example, the container 404 may be integrated into a front side of the interaction platform 116 underneath the elevated portion of the starting portion 130. In further implementations, the container 404 may include a door or latch that opens and closes to allow access to the contents of the container. In further implementations, the container 404 may be a rotatable chamber configured to rotate via a hinge and is configured to pivot about the hinge between an open position and a closed position. In some implementations, the open position allows for access of the contents, such as token(s) 126 and/or physical vehicle(s) 120. In some implementations, the closed position store and retains the token(s) 126 and/or physical vehicle(s) 120. In further implementations, when the container 404 is in the closed position, the container 404 appears to be flush with the front side of the interaction platform 116. In some implementations, the container 404 may include a first vertical side forming a vertical side of the body 401 when the container 404 is in the closed position and rotates to a horizontal orientation when the container 404 is in the open position to reveal the cavity for holding the plurality of token(s) 126 and/or other objects (such as physical vehicle(s) 120).

In some implementations, the interaction platform 116 may include an interaction area 410 in which tokens 126 may be placed by a user for the capture device to capture. The interaction area 410 may comprise at least a portion of a top surface of the interaction platform in which one or more token(s) 126 may be placed by a user. In some implementations, the interaction area 410 may be a designated interaction area including a distinct texture that is detectable by the camera, and the designated interaction area may represent a portion of the interaction platform 116 where a token 126 may be placed. In some implementations, the interaction area 410 includes a channel or hole in which one or more tokens 126 may be positioned or stacked for the capture device to capture. In further implementations, the interaction area 410 may include magnetic coupling devices configured to magnetically couple with magnetic components within the token 126 as the token 126 is placed in the interaction area 410 by a user. In further implementations, as part of the rules of a virtual game, a user may be required to place one or more tokens 126 within specific areas of the interaction area 410 or the virtual game may not execute a specific virtual action. In some implementations, the interaction platform 116 may be formed out of various materials including, molding plastic, metals, etc. that retain a shape.

Figure 5A:
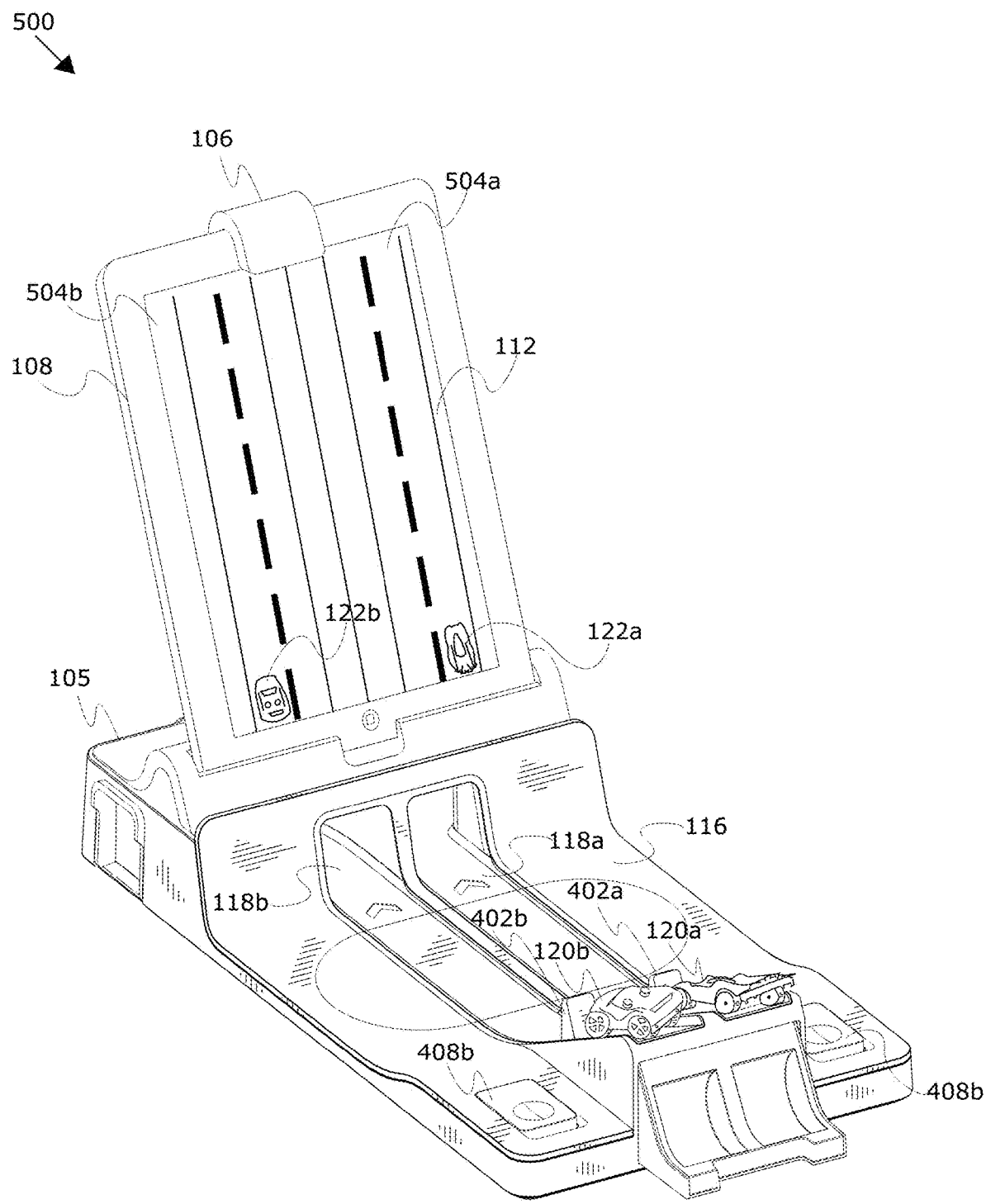
FIGS. 5A-5D depict an example configurations for deploying physical objects into a virtual environment.

FIGS. 5A-5D are graphical representations illustrating an example configuration for deploying physical objects into a virtual environment. In FIG. 5A, the example configuration 500 depicts two physical vehicles 120a and 120b situated on the tracks 118a and 118b respectively. The detector 304 may identify the placement of the physical vehicles 120 on the tracks 118 and the activity application(s) 214 may execute a virtual game causing the display 112 to display virtual roads 504. In further implementations, the detector 304 may identify the specific physical vehicles 120a and 120b based on captured information from the capture device and the activity application(s) 214 may retrieve vehicle profiles based on the specific physical vehicles 120a and 120b that may be used to generate a virtual vehicle representation 122.

Figure 5B:
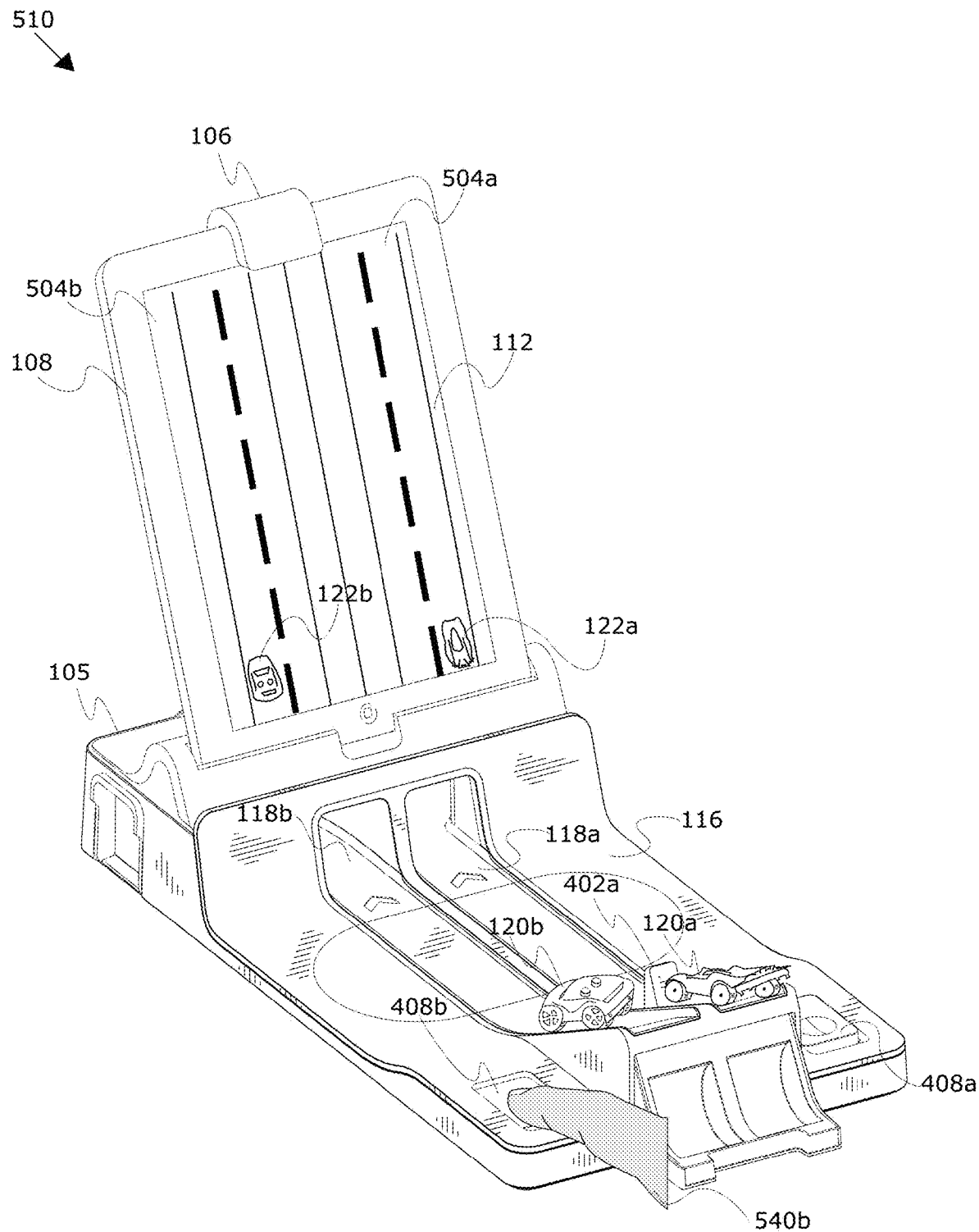

In FIG. 5B, the example configuration 510 depicts a press of trigger 408b by a user's hand 540b. In some implementations, the detector 304 may be configured to identify a position and/or movement of a user's hand 540b near the trigger 408 and cause the activity application(s) 214 to render a revving sound mimicking a revving noise of a real vehicle (which may be unique to the specific vehicle, based on a physical vehicle 120 profile as discussed elsewhere herein). In some implementations, the sounds (e.g., the revving, etc.) may coincide with a movement of the user's hand 540b or other part of a user 222 captured by the capture device and detected by the detector 304. For example, as a user's hand 540b gets closer to the trigger 408, the revving sound increases, as the user's hand 540b may be pulled away, the revving sounds decreases. In further implementations, the detector 304 may identify the movement of the trigger 408 as the trigger 408 is depressed and as the trigger 408 is depressed (but before the mechanical linkage releases the retaining mechanism 402) the revving sound increases and decreases as the detector 304 detects the trigger 408 rising back to its original position. In further implementations, the activity application(s) 214 may render and display a visual indicator (not shown) that displays on the display screen 112 a visual representation of the motor revving (e.g., "vroom vroom vroom", etc.). This visual representation may simulate the revving of the car, and as the user's hand 540b interacts with and/or nears the trigger 408, the detector 304 can detect the movement and simulate a revving of the engine of the motor.

In some implementations, the activity application(s) 214 may display a starting visual (see FIG. 10a) on the display 112 that indicates to a user when to press the trigger 408 and cause the release of the physical vehicle 120. In some implementations, the starting visual may be a countdown signaling a precise moment when a user can press the trigger 408. For example, a light bar may be displayed as a visual indicator with three lights that light up one after the other. Once the third light is lit up, the user can press the trigger 408 to release at the appropriate time. In some implementations, the starting visual may display a countdown from "3" to "2" to "1" and then display a "GO" visual indicator indicating that the user can press the trigger 408. The detector 304 may detect when a user presses the trigger 408 in relation to the starting visual signaling for the user to press the trigger 408. For example, if the detector 304 detects that the user pressed the trigger 408 too early and released the physical vehicle 120 too soon, the activity application(s) 214 may cause the virtual game to apply a timing disadvantage to the virtual vehicle representation 122, such as a speed decrease, point decrease, etc. In another example, if the detector 304 detects that the user pressed the trigger 408 within a specific time interval, the activity application(s) 214 may apply a timing advantage (as described with respect to FIGS. 10A-10C) to the virtual game, such as a speed boost, extra points, etc.

As shown in the example configuration 510 in FIG. 5B, a user has pressed trigger 408b, causing retaining mechanism 402b to move and physical vehicle 120b to release down the track 118b. While physical vehicle 120a has not been released in the example in FIG. 5B, it should be understood that both physical vehicle 120a and 120b may be released together, separately, or with additional physical vehicles 120 not shown in the example. As physical vehicle 120b travels down the track 118b, the activity application(s) 214 causes a virtual vehicle representation 122b to appear on the virtual road 504b. In some implementations, the speed at which the virtual vehicle representation 122b appears to be traveling along the virtual road 504b is related to a calculated speed of the physical vehicle 120b as it travels along the track 118b.

Figure 5C:
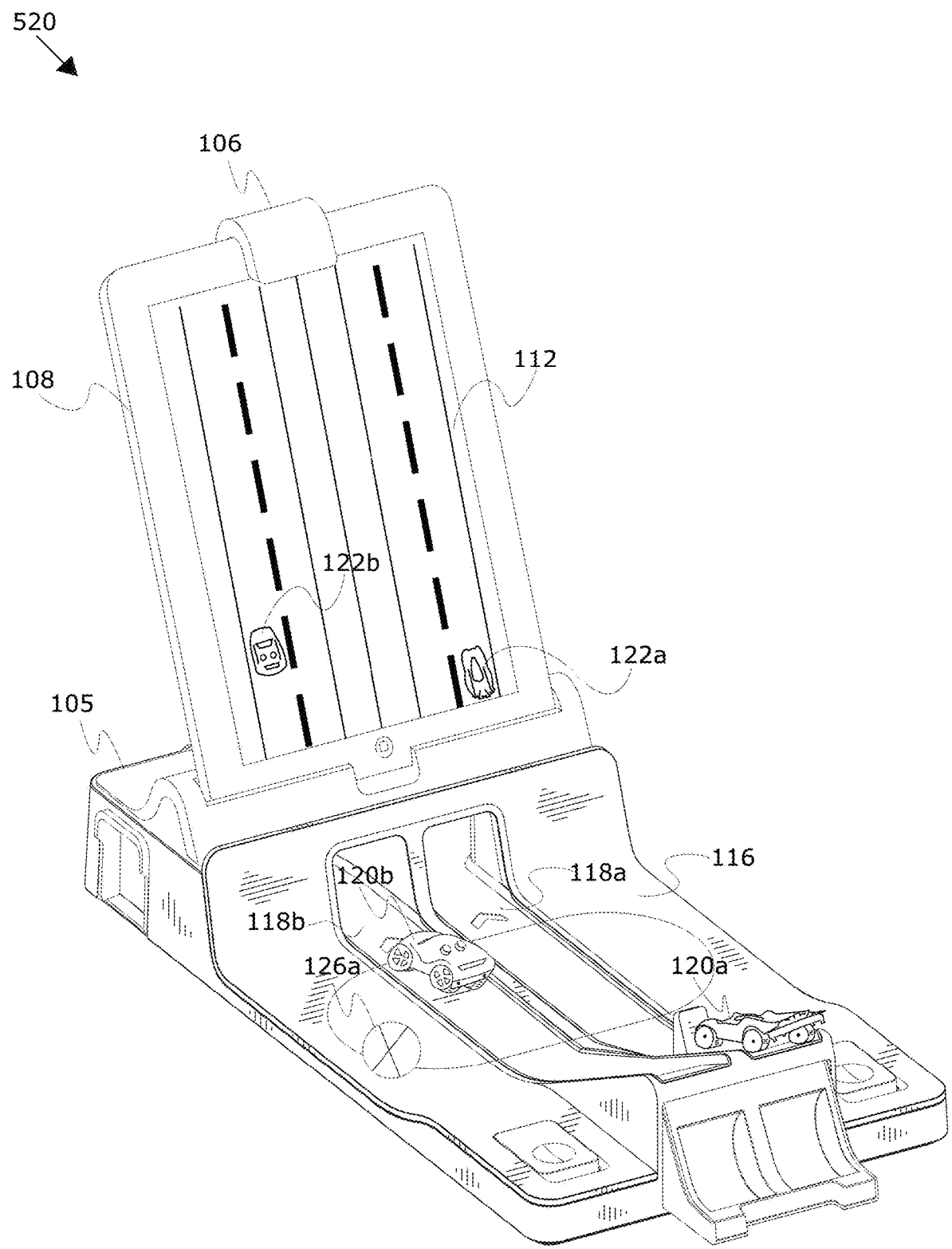

In FIG. 5C, the example configuration 520 depicts the physical vehicle 120b traveling along the track 118b. As the physical vehicle 120b travels along the track 118b, the activity application(s) 214 updates a position of the virtual vehicle representation 122b in the virtual game. A user may place a token 126a onto the surface of the interaction platform 116 and the detector 304 may detect the placement and identity of the token 126a. In some implementations, the user may place the token 126a in order to control the virtual vehicle representation 122b. The detector 304 may provide the identity of the detected token 126a to the activity application(s) 214 and based on the identity of the token 126a the activity application(s) 214 may manipulate the virtual game. For example, the activity application(s) 214 may speed up the virtual vehicle representation 122*b* if a speed up token was played, attack an adjacent vehicle if an attack token was played, slow down the virtual vehicle representation 122*b* if a slow down token was played, jump the virtual vehicle representation 122*b* if a jump token was played, switch lanes of the virtual vehicle representation 122*b* if a switch lane token was played, etc. Any suitable manner of control may be incorporated based on the placement of specific tokens. In some implementations, the timing of the placement of the token 126 may correspond to the timing of the action by the activity application(s) 214. For example, if a user does not place a jump token in a specific period of time, then the virtual vehicle representation 122*b* will not jump and may crash into a virtual obstruction (not shown) in the virtual game.

A user may continue to interact with the virtual game by timing and correctly placing tokens 126 to control the virtual vehicle representation 122 in the virtual game. It should be understood that the user may control the virtual vehicle representation 122 in ways other than or in conjunction with tokens 126. For example, a microphone may receive audible commands from a user, a game pad or controller connected to the computing device 108 may send commands, a physical trigger incorporated into the interaction platform 116 that a user may press, etc.

Figure 5D:
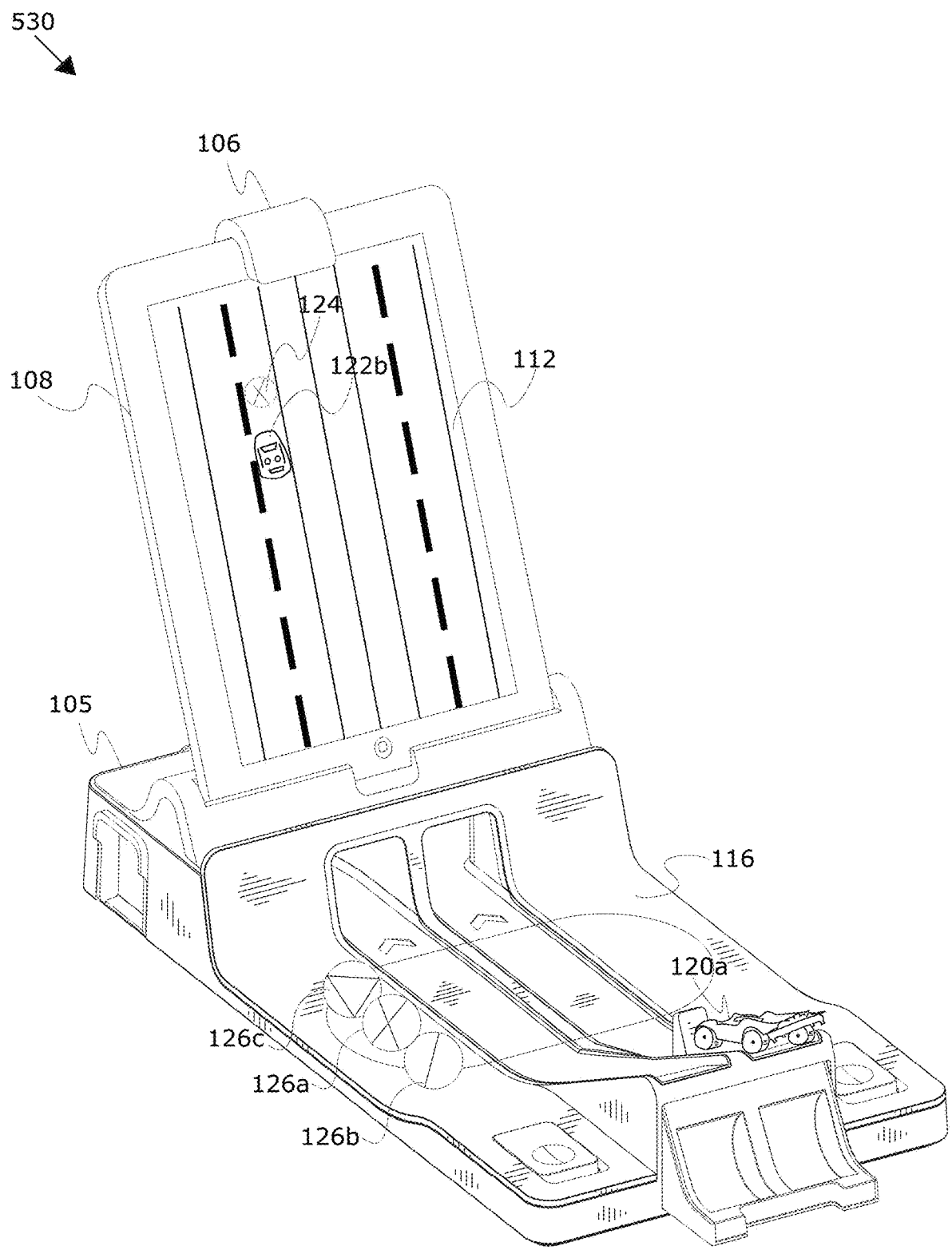

In FIG. 5D, the example configuration 530 depicts the virtual vehicle representation 122*b* continuing to be controlled by the placement of tokens 126*b* and 126*c* causing the virtual vehicle representation 122*b* to be manipulated by the activity application(s) 214 in the virtual game. As shown in the example, the activity application(s) 214 may cause one or more virtual objectives 124 to be displayed in the virtual game that a user may interact with. For example, the activity application(s) 214 may cause a virtual objective 124 representing a boost to be displayed in a lane of the virtual road 504*b* and the user may place a lane change token (such as token 126*b* or 126*c*) on the interaction platform 116 to cause the virtual vehicle representation 122*b* to switch into the lane with the virtual objective 124 and receive a boost in speed, points, distance traveled, etc. within the virtual game. As shown in the example configuration 530, the user may continue to interact with the virtual vehicle representation 122*b* even after the physical vehicle 120*b* has exited the field of view 140 of the capture device (by traveling into the tunnel and/or exiting the track 118). By continuing to interact with the virtual vehicle representation 122*b* even after the physical vehicle 120*b* has been stopped or lost momentum, a user is able to continue the natural flow of play and extend the enjoyment of the activity of moving a car down a track beyond the capabilities of what a car rolling along a track would provide using only the physical components. The interaction also provides a blended opportunity of using a physical vehicle 120*b* to begin an interaction and continuing the interaction using the virtual vehicle representation 122*b*.

FIG. 6A is a top-view of the example interaction platform 116. The interaction platform 116 may include visual characteristics to provide information to the detector 304 of the positions and locations of various objects over time. For example, the starting portions 130 may include visual cues 602 that may signal to the detector 304 a position of a physical vehicle 120 as a physical vehicle 120 moves out of the starting portion 130. In some implementations, the visual cues 602 may be obscured when the physical vehicle 120 is placed over the top of visual cues 602. As the physical vehicle 120 moves out of the starting portion 130, an increasing amount of the visual cue 602 may be exposed and identified by the detector 304 over time. These visual cues 602 may allow the detector 304 to identify a speed of the physical vehicle 120 and a comparison of the movement of the physical vehicle 120 over time or compared to adjacent physical vehicles 120 that may be racing.

In some implementations, the interaction platform 116 may further include retaining mechanism cues 604. The retaining mechanism cues 604 may be markings or characteristics present on the retaining mechanism 402. As a trigger 408 is pressed, causing the retaining mechanism 402 to fold into the cavity below the surface of the track 118, the retaining mechanism cues 604 may be obscured and hidden from view as described in more detail with respect to FIG. 6B. The detector 304 may identify how many retaining mechanism cues 604 are present and provide that information to the activity application(s) 214. For example, as a user slowly presses a trigger 408, causing the retaining mechanism 402 to fold down and an increasing amount of the retaining mechanism cues 604 are obscured, the detector 304 more provide the information on identified retaining mechanism cues 604 to the activity application(s) 214 and the activity application(s) 214 may cause a louder engine revving noise to be made as less retaining mechanism cues 604 are detected.

In some implementations, the interaction platform 116 may further include a texture line 606 indicating a boundary of the interaction area 410 portion of the surface of the interaction platform 116. The texture line 606 may be capable of being identified by the detector 304, allowing the detector 304 to identify when tokens 126 (not shown) are placed within the interaction area 410. For example, in some implementations, the texture line 606 may be a difference in the texture of the surface of the interaction platform. In further implementations, the texture line 606 may be a line or other visual indicator present on the surface of the interaction platform. As shown in FIG. 6A, flip-down doors 608 may be included at the tunnel exit 412 in order to halt the travel of the physical vehicle 120 as the physical vehicle 120 leaves the tunnel exit 412. In further implementations, the flip-down doors 608 may be folded up allowing the physical vehicle 120 to continue traveling. In some implementations, additional pieces of track may be connected to the tunnel exit 412 allowing the physical vehicle 120 to continue traveling along the track.

Figure 6B:
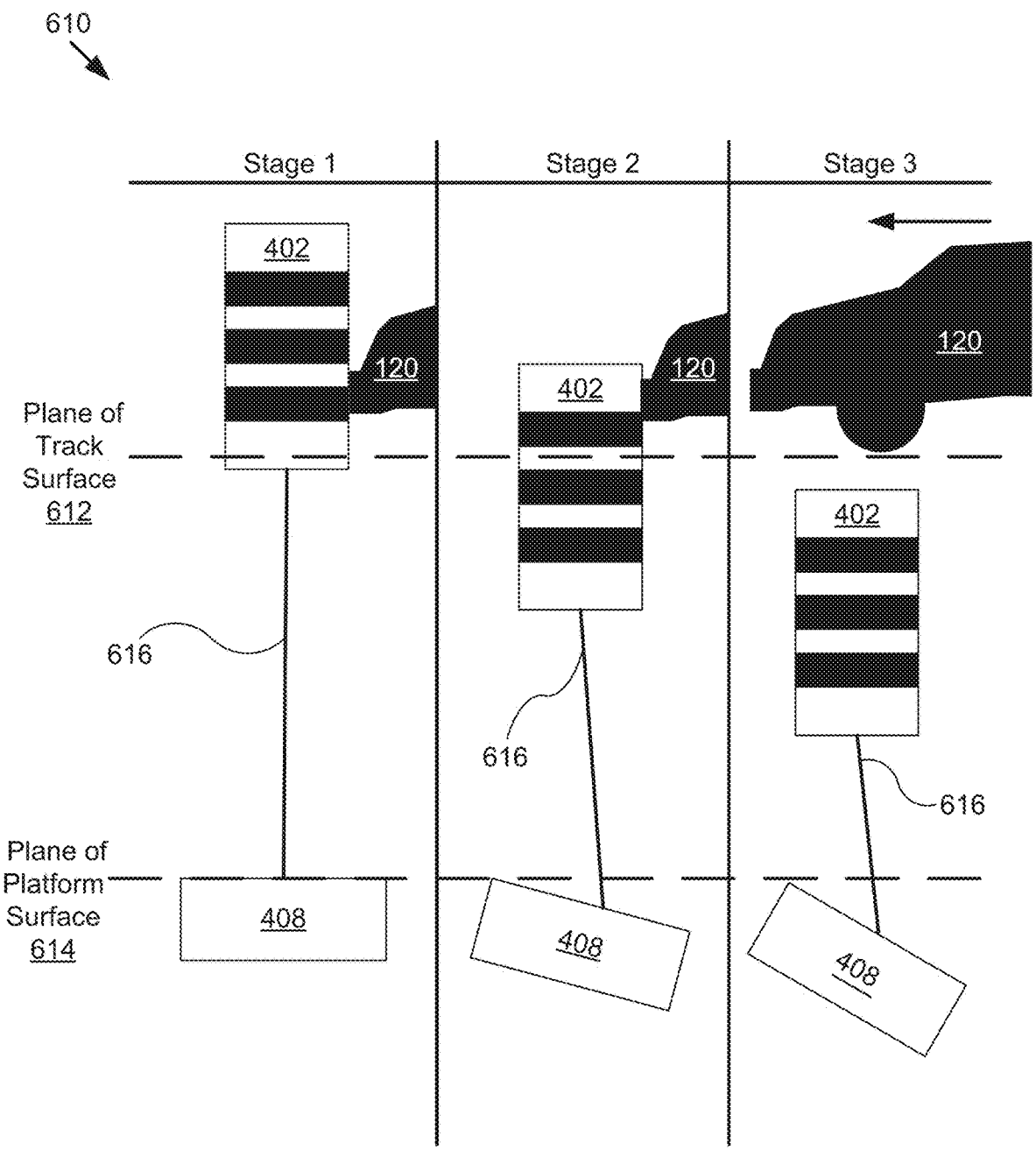

FIG. 6B is an example of the interaction between the retaining mechanism 402 and the trigger 408. In the example, stage 1 shows the retaining mechanism 402 with retaining mechanism cues 604 visible above the plane of the track surface 612. In stage 1, a mechanical linkage 616 connects the retaining mechanism 402 to the trigger 408 and the trigger 408 has not been depressed (e.g., pressed, activated, etc.) and a portion of the trigger 408 may appear above the plane of the platform surface 614, while in other implementations, the trigger 408 may be flush with the surface and/or recessed below the surface. During stage 1, the detector 304 may identify the quantity of the retaining mechanism cues 604 that are not obscured (such as by the plane of the track surface 612) using image processing techniques.

In the example, stage 2 shows the trigger 408 partially depressed (e.g., partially pressed) such that a portion of the trigger 408 is below the plane of the platform surface 614. As the trigger 408 is partially activated, (for example, partially depressed), the mechanical linkage 616 causes the retaining mechanism 402 to partially move below the plane of the track surface 612. As the retaining mechanism 402 moves partially below the plane of the track surface 612, a quantity of the retaining mechanism cues 604 may be obscured such that a capture device may only be able to detect a portion of the retaining mechanism cues 604. During stage 2, the detector 304 may identify a change in the quantity of retaining mechanism cues 604 that are not obscured (such as by the plane of the track surface 612).

In the example, stage 3 shows the trigger 408 fully activated (for example, fully depressed) such that the mechanical linkage causes the top of the retaining mechanism 402 to move substantially below the plane of the track surface 612. As described elsewhere herein, in some implementations, as the retaining mechanism 402 moves down, a physical vehicle 120 being retained, may be allowed to pass over, around, or through the retaining mechanism 402 and move along the track 118 (not shown). During stage 3, the detector 304 may identify a change in the quantity of retaining mechanism cues 604 that are not obscured (if any).

Figure 7A:
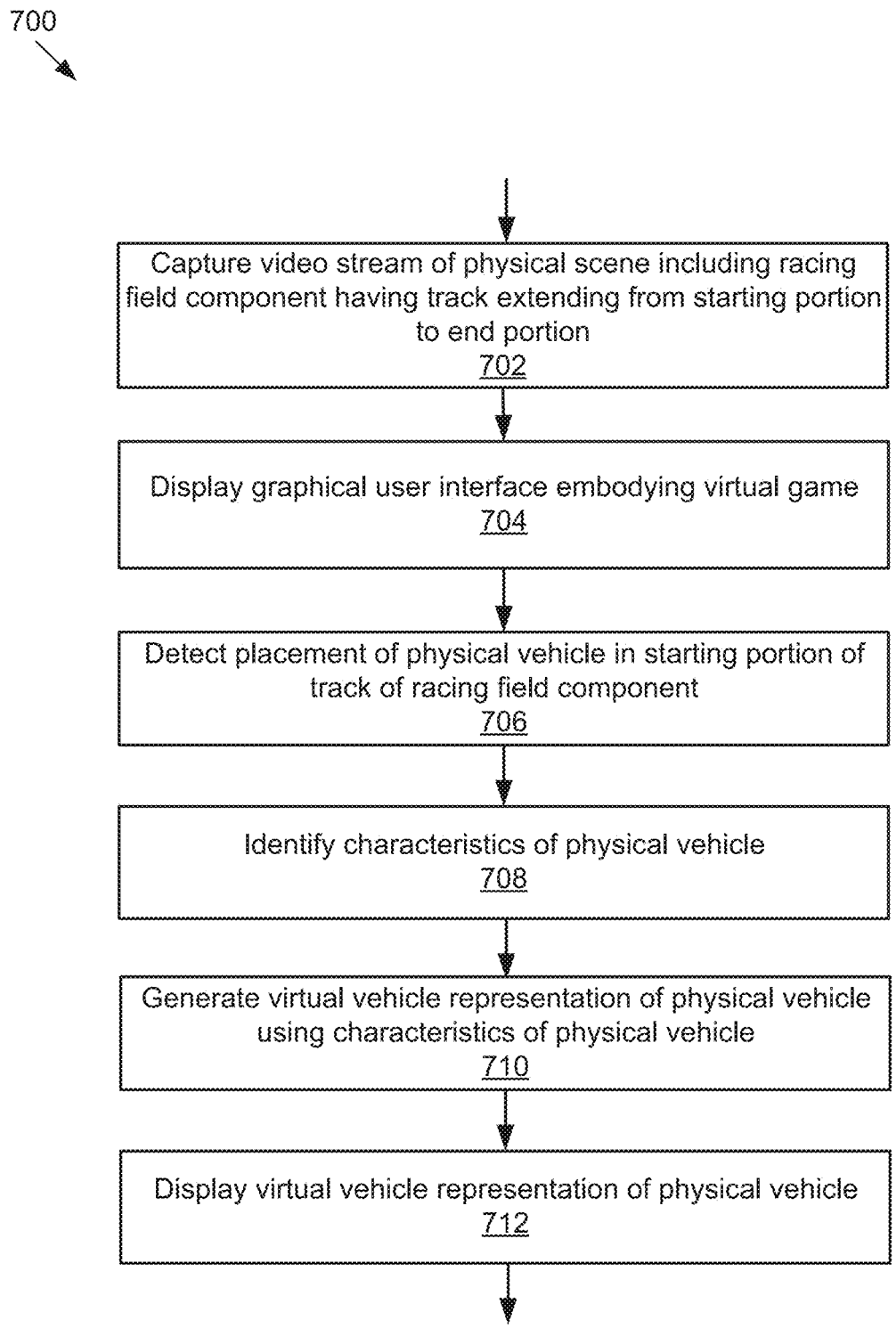
FIGS. 7A-7E are flowcharts of example methods for virtualized interaction with tangible objects.

FIG. 7A is a flowchart of an example method 700 for virtualized interaction with tangible objects. At 702, the capture device (e.g., the camera 110) captures a video stream of a physical scene including the interaction platform 116. The interaction platform 116 having a track 118 extending from the starting portion 130 to the end portion 416. The video stream may include a placement of the physical vehicle 120 at the starting portion 130. The placement of the physical vehicle 120 may include a user placing the physical vehicle 120, such that a front of the physical vehicle rest against a front face of the retaining mechanism 402 holding the physical vehicle 120 in place.

At 704, the activity application(s) 214 displays a graphical user interface embodying a virtual game. The virtual game may include the racing examples as described elsewhere herein, such as a virtual road and virtual objectives 124. At 706, the detector 304 detects the placement of the physical vehicle 120 in the starting portion 130 of the track 118 of the interaction platform 116. The detector 304 may detect the placement of the physical vehicle 120 by processing the captured video stream. In further implementations, the capture device may continue to capture additional video over time and the detector 304 may continue to process the video stream and detect information (such as the placement of another physical vehicle 120).

At 708, the activity application(s) 214 may identify characteristics of the physical vehicle 120 placed in the starting portion 130. The characteristics may include a color, a shape, a texture, a unique identifying mark, color, a type, a model, etc. that may detected by the activity application(s) 214 using image processing techniques to process the video stream. In further implementations, the activity application(s) 214 may identify one or more characteristics of the physical vehicle 120 and match those characteristics to a vehicle profile that includes a previously rendered virtualization of the physical vehicle 120.

At 710, the activity application(s) 214 may generate a virtual vehicle representation 122 of the physical vehicle 120 using the characteristics of the physical vehicle 120. The activity application(s) 214 may identify a virtual vehicle representation 122 based on the characteristics by comparing the characteristics to a database of virtual vehicle representation data or vehicle profiles. In further implementations, the activity application(s) 214 may retrieve a basic model and overlay the specific characteristics onto the basic model to generate the virtual vehicle representation 122 that includes a similar characteristic or appearance as the physical vehicle.

At 712, the activity application(s) 214 may present on the display of the computing device 108 the virtual vehicle representation 122 of the physical vehicle 120. In some implementations, the activity application(s) 214 may display the virtual vehicle representation 122 at a start of a virtual track in the virtual game, similar to how the physical vehicle 120 may be placed at the starting portion 130 of the track 118.

Figure 7B:
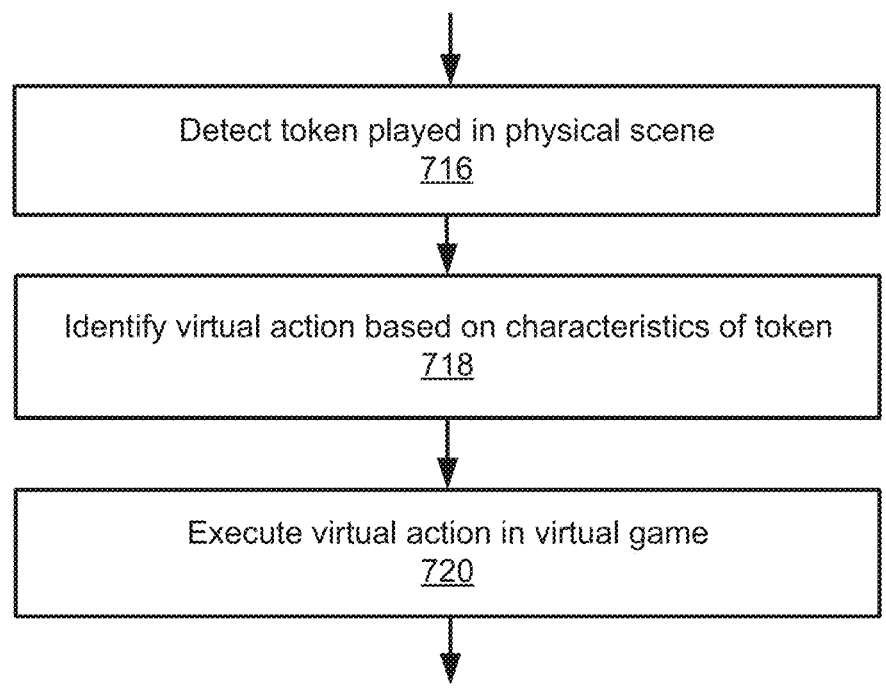

FIG. 7B is a flowchart of another example method 714 for virtualized interaction with tangible objects. At 716, the activity application(s) 214 may detect a token 126 played in an activity scene. In some implementations, the activity scene may include the surface of the interaction platform 116, while in further implementations, the physical scene may also include the area proximate to the interaction platform 116 that is within a field of view 140 of the camera 110. The activity application(s) 214 may detect one or more characteristics of the token 126 by performing image processing to detect contours and then may compare the contours to a database of objects to determine the type of token 126 and characteristics of the token 126 detected in the video stream. In some implementations, the activity application(s) 214 may be configured to detect tokens 126 by comparing the contours to a database of token profiles and match the detected contours to a specific token profile with the same identified contours in the database.

At 718, the activity application(s) 214 may identify a virtual action based on the characteristics of the token 126. In some implementations, specific characteristics of the identified token may correlate to specific actions in the virtual game. As described elsewhere herein, the virtual actions may be actions that cause specific things to happen in the virtual game, such manipulating the virtual vehicle representation 122, placing a new virtual objective 124, etc.

At 720, the activity application(s) 214 may execute the virtual action in the virtual game. In some implementations, the virtual action may cause a change in the virtual vehicle representation 122, such as a change in position, a change in perceived speed, a change in direction, etc. In some implementations, the activity application(s) 214 may execute the virtual action based on the action identified as being associated with the token 126 as described elsewhere herein. In some implementations, executing the virtual action may cause an action to be displayed in the virtual game that alters what is happening in the virtual game, such as a jump, attack, boost, bonus, etc. associated with a virtual vehicle representation 122. In further implementations, the virtual action may cause virtual game to display characteristics in the environment, such as lightning effects, adding darkness, changing a portion of a virtual vehicle representation of the track, etc.

In some implementations, the activity application(s) 214 may determine that the virtual action corresponds to the virtual vehicle representation 122 of the physical vehicle 120. For example, if two users are each placing tokens 126 in the interaction area 410, the activity application(s) 214 can determine which virtual vehicle representation 122 is associated with each token 126 that is placed. If a first user places an attack token 126, even if it is placed on an opposite side where a second user is placing their token 126, the activity application(s) 214 can identify that the attack token 126 is associated with the first user and have the first user's virtual vehicle representation 122 execute an attack. In some implementations, the activity application(s) 214 may identify which token 126 may be placed by each user based on a characteristic (such as a color, marking, etc.) of the token 126.

Figure 7C:
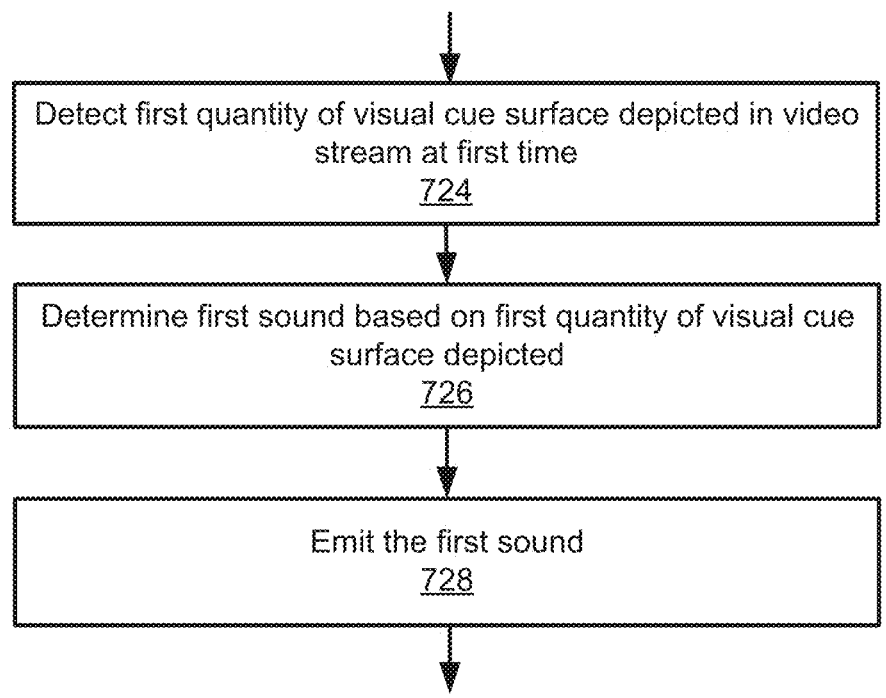

FIG. 7C is a flowchart of an example method 722 for virtualized interaction with tangible objects. At 724, the activity application(s) 214 may detect a first quantity of visual cue surface depicted in the video stream at a first time. The visual cue surface may be a portion of the interaction platform 116 that includes visual markings and/or characteristics that are detectable by the camera 110. The visual cue surface may include the retaining mechanism cues 604 locating on a surface of the retaining mechanism 402 and/or the starting portion cues 602 located on a surface of the starting portion 130. A quantity of the visual cue surface may be detectable by the activity application(s) 214 processing the video stream while another quantity of the visual cue surface may be obscured (such as by a surface/plane of the interaction platform 116, a placed physical vehicle 120, a user's hand, etc.). Criteria may be included, such that if a quantity of visual cue surface is detected, an action may be performed. For example, in some implementations, as the trigger 408 is depressed, a portion of markings on the retaining mechanism 402 of the visual cue surface may be obscured by a surface of the track 118 as the retaining mechanism 402 moves below the surface of the track 118.

At 726, the activity application(s) 214 may determine a first sound based on the first quantity of the visual cue surface depicted. In some implementations, as the activity application(s) 214 detects the quantity of visual cue surface that is visible in one or more frames of the video stream at one or more periods of time, the activity application(s) 214 may compare the amount of detected visual cue surface to one or more sound conditions and determine which sound is appropriate based on the quantity of visual cue surface. For example as described elsewhere herein, as a trigger 408 is depressed causing the mechanical linkage to move a portion of the retaining mechanism 402 below the surface of the track 118 and obscure one or more of the visual cues, the activity application(s) 214 may identify that when one visual cue is obscured a first sound condition may be satisfied and when two visual cues are obscured a second sound condition may be satisfied, such as a quite "vroom" for the first sound condition and a louder "VROOM VROOM" for the second sound condition.

At 728, the activity application(s) 214 may emit the first sound using an audio reproduction device, such as a speaker, etc. For example, if the first sound indicates that a partial press of the trigger 408 has occurred, then the first sound may be of an upcoming release, such as a "vroom vroom" noise and the activity application(s) 214 may cause the audio reproduction device to output the "vroom vroom" noise. By outputting a sound, as described elsewhere herein, a user is able to interact with the digital game by merely pushing a trigger 408, or even moving a hand proximate to the trigger, etc. and causing the virtual game to respond with audio and/or visual experiences.

Figure 7D:
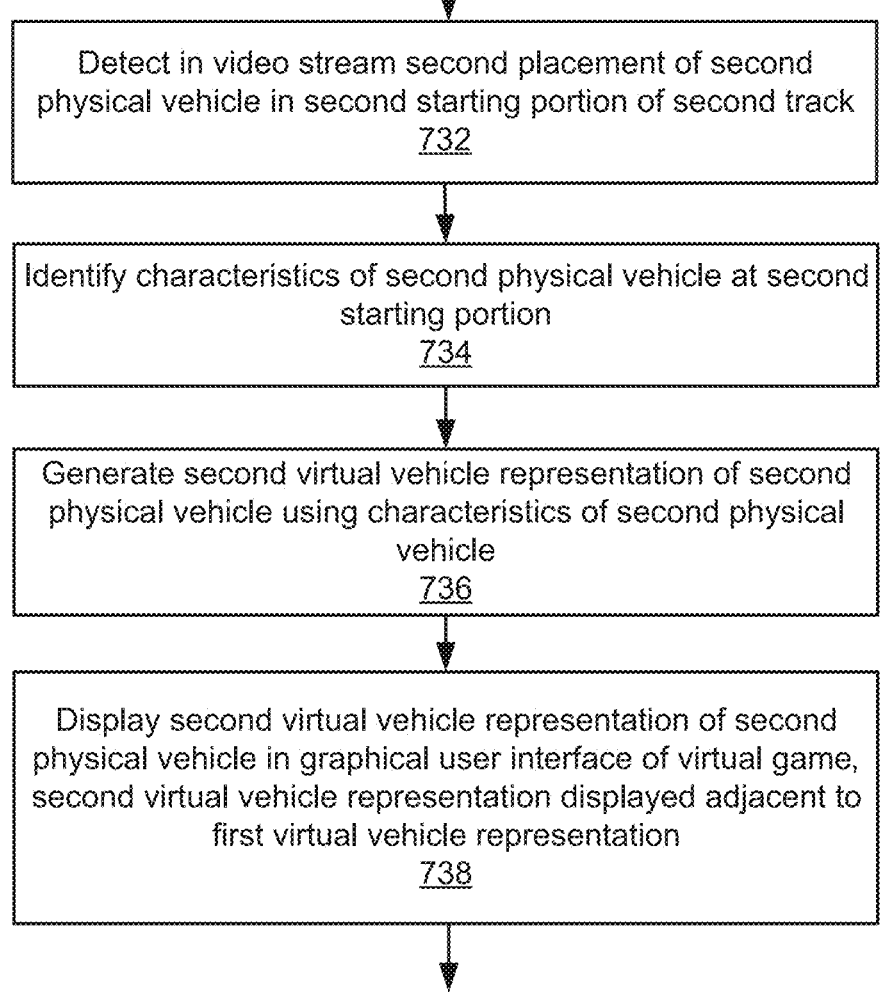

FIG. 7D is a flowchart of an example method 730 for virtualized interaction with tangible objects. At 732, the activity application(s) 214 may detect in the video stream, a second placement of a second physical vehicle 120b in a second starting portion 130b of the second track 118b. In some implementations, the second physical vehicle 120b may be placed adjacent to a first physical vehicle 120a located on a first track 118a. In some implementations, the first physical vehicle 120a may be placed by a first user and the second physical vehicle 120b may be placed by a second user.

At 734, the activity application(s) 214 may identify one or more characteristics of the second physical vehicle 120b at the second starting portion 130b. As described elsewhere herein, the activity application(s) 214 may be configured to identify characteristics of any number of physical vehicle(s) 120 placed at the starting portion(s) 130. At 736, the activity application(s) 214 may generate a second virtual vehicle representation 122b of the second physical vehicle 120b using the characteristics of the second physical vehicle 120b. As described elsewhere herein, the activity application(s) 214 may be configured to generate any number of virtual vehicle representation(s) 122 using characteristics of physical vehicle(s) 120.

Figure 7E:
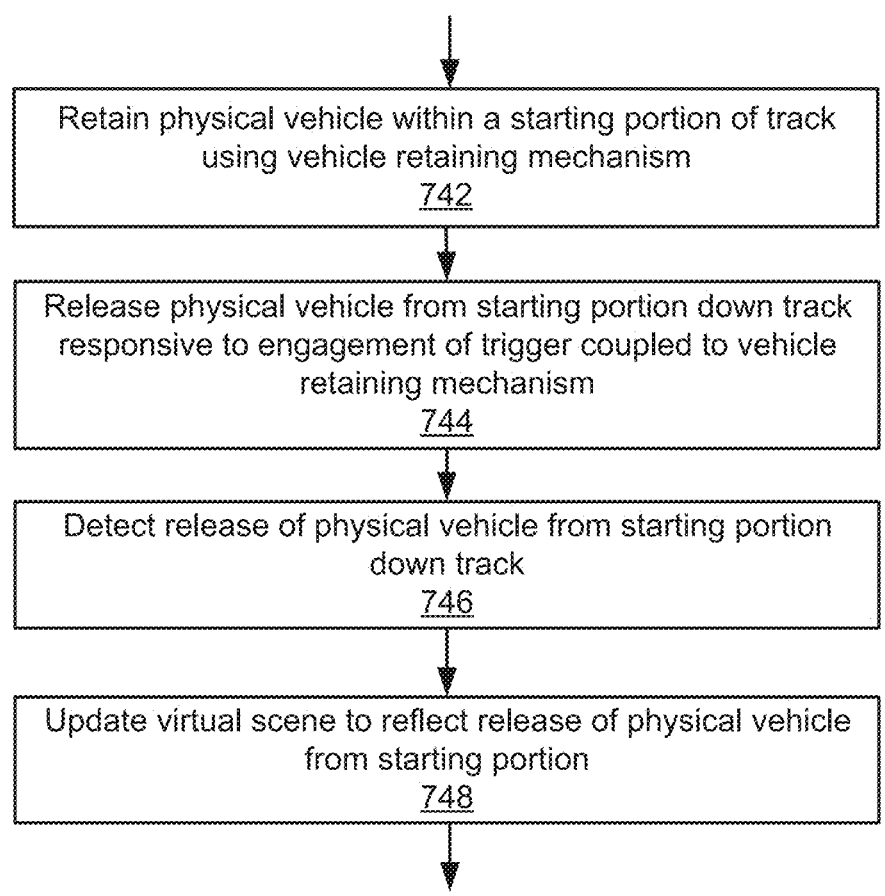

At 738, the activity application(s) 214 may display the second virtual vehicle representation 122b of the second physical vehicle 120b in the graphical user interface of the virtual game. In some implementations, the second virtual vehicle representation 122b may be displayed adjacent to the first virtual vehicle representation 122a. For example, in some implementations, both the first virtual vehicle representation 122a and the second virtual vehicle representation 122b may appear adjacent to each other on a same virtual track in the virtual game. While in other implementations, the first virtual vehicle representation 122a may appear on a first virtual track and the second virtual vehicle representation 122b may appear on a second virtual track separate from the first virtual track. This allows for a broader expansion of gameplay as users can race together and/or separately, and even in some implementations, play different games on different tracks individually, while still sharing a same display screen. FIG. 7E is a flowchart of an example method 740 for virtualized interaction with tangible objects. At 742, the interaction platform 116 retains the physical vehicle 120 within a starting portion 130 of the track 118 using the vehicle retaining mechanism 402. As described elsewhere herein, the interaction platform 116 may be configured to retain and/or hold one or more physical vehicle(s) 120 that are placed in the starting portion 130 of the track 118. At 744, the interaction platform 116 may release the physical vehicle 120 from the starting portion 130 down the track 118 responsive to an engagement of the trigger 408 coupled to the vehicle retaining mechanism 402. As described elsewhere herein, as a trigger 408 is engaged (such as a press, etc.) the mechanical linkage causes the vehicle retaining mechanism 402 to stop retaining (such as by moving below a surface of the starting portion 130, decoupling a hook/bar, etc.).

At 746, the interaction platform may include an application executable by a computing device that is capable of detecting the release of the physical vehicle 120 from the starting portion 130 down the track 118. The release may be detectable by a processor of the computing device 108 analyzing a video stream that includes the release of the physical vehicle 120. At 748, the interaction platform supporting the computing device that may execute an application that updates a virtual scene to reflect the release of the physical vehicle 120 from the starting portion 130. In some implementations, the virtual scene may be updated to include a virtual vehicle representation 122 moving in the virtual scene based on the release.

In some implementations, the detector 304 detects a movement of the physical vehicle 120 on the track 118 of the interaction platform 116. In some implementations, the movement may be the physical vehicle 120 traveling down the track 118 after the retaining mechanism 402 folded down in response to trigger 408 being pressed by a user. In further implementations, the physical vehicle 120 may travel down the track for various reasons, such as being pushed by a user, etc. The detector 304 may analyze the video stream to identify the position of the physical vehicle 120 in relation to various visual cues on the interaction platform 116.

In some implementations, the activity application(s) 214 may execute a virtual movement of the virtual vehicle representation 122 in the virtual game based on the detected movement of the physical vehicle. The virtual movement may be a displayed traveling speed in the virtual game making the virtual vehicle representation 122 appear to move faster and/or slower. The virtual movement may include an action in response to a token 126 being detected on the interaction area 410 or something else triggering an action as described elsewhere herein. The activity application(s) 214 may calculate a speed of the physical vehicle 120 and relative to that calculated speed, make the virtual vehicle representation 122 appear to move faster or slower based on whether the calculated speed was above or below a comparative value.

Figure 8:
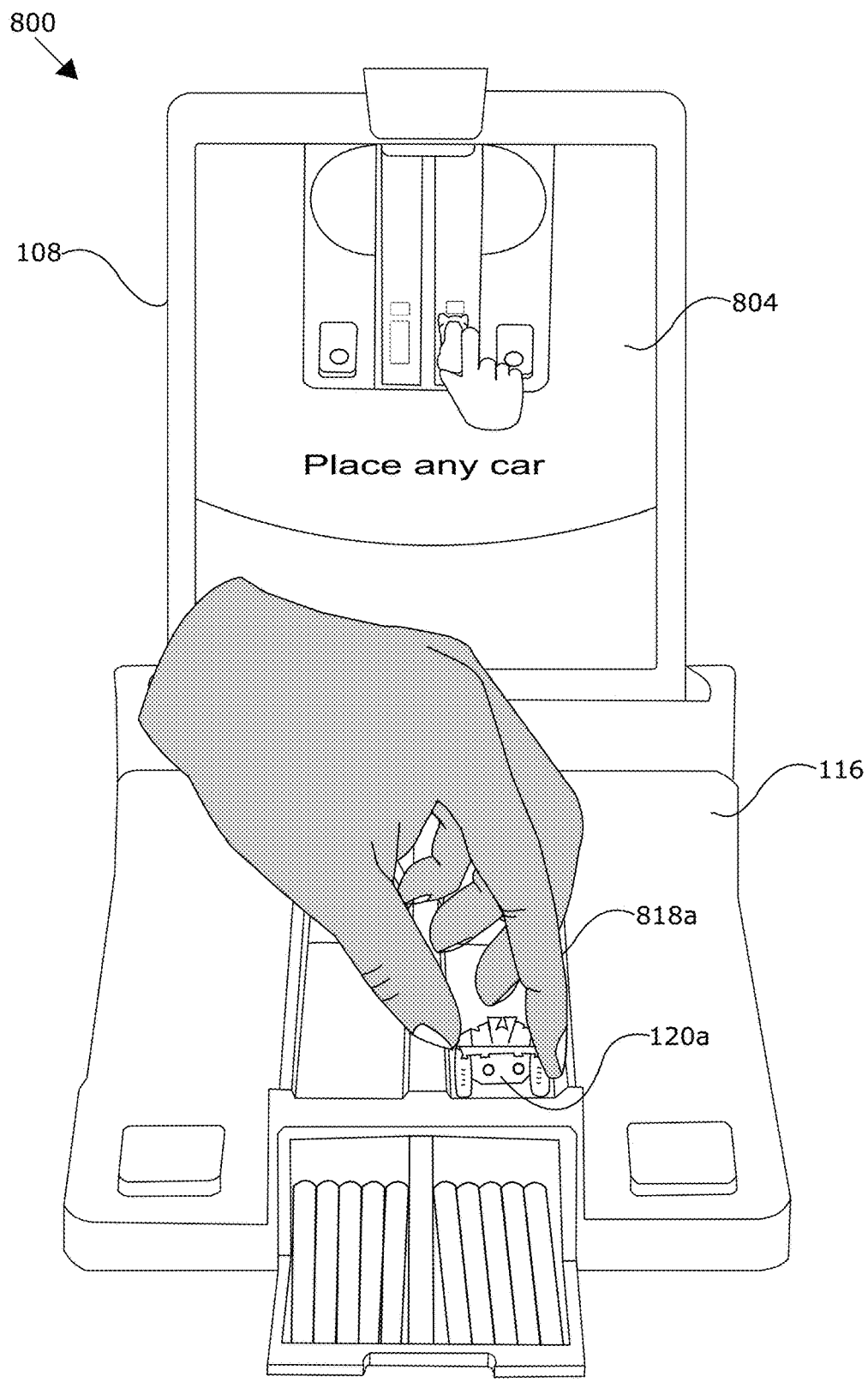
FIGS. 8-14 depict various graphical representations of example graphical user interfaces and interaction platform configurations.

FIG. 8 is an example graphical user interface ("GUI") 800 displaying setup instructions 804 and the interaction platform 116. In some implementations, the activity application(s) 214 may cause the display 112 to display setup instructions 804. The setup instructions 804 may include an animation depicting a graphic of a hand placing a car on a track. The animation may signal to a user how to position the physical vehicle 120 on the track 118 of the interaction platform 116 to setup the components before starting a virtual game. In some implementations, the activity application(s) 214 may determine when a virtual game is about to start and cause the display screen to display the setup instructions 804. For example, the activity application(s) 214 may receive information from the detection engine 212 signaling that interactions between one or more physical vehicle(s) 120 and a user is occurring within the field of view 140 of the camera 110. In further implementations, the activity application(s) 214 may cause the setup instructions 804 to be displayed in response to a user interacting with the display screen, such as pressing an interactive trigger to start a virtual game.

In some implementations, the setup instructions 804 may include a request for one or more specific physical vehicles 120. For example, in a specific virtual game only a certain type of physical vehicle 120 may be placed on the track 118 to meet the requirements of the game. In this example, the request may be for that certain type of physical vehicle 120. In further implementations, any physical vehicle 120 may be placed on the track 118 for the virtual game and the request may be for any type of physical vehicle 120 as shown in FIG. 8.

Figure 9:
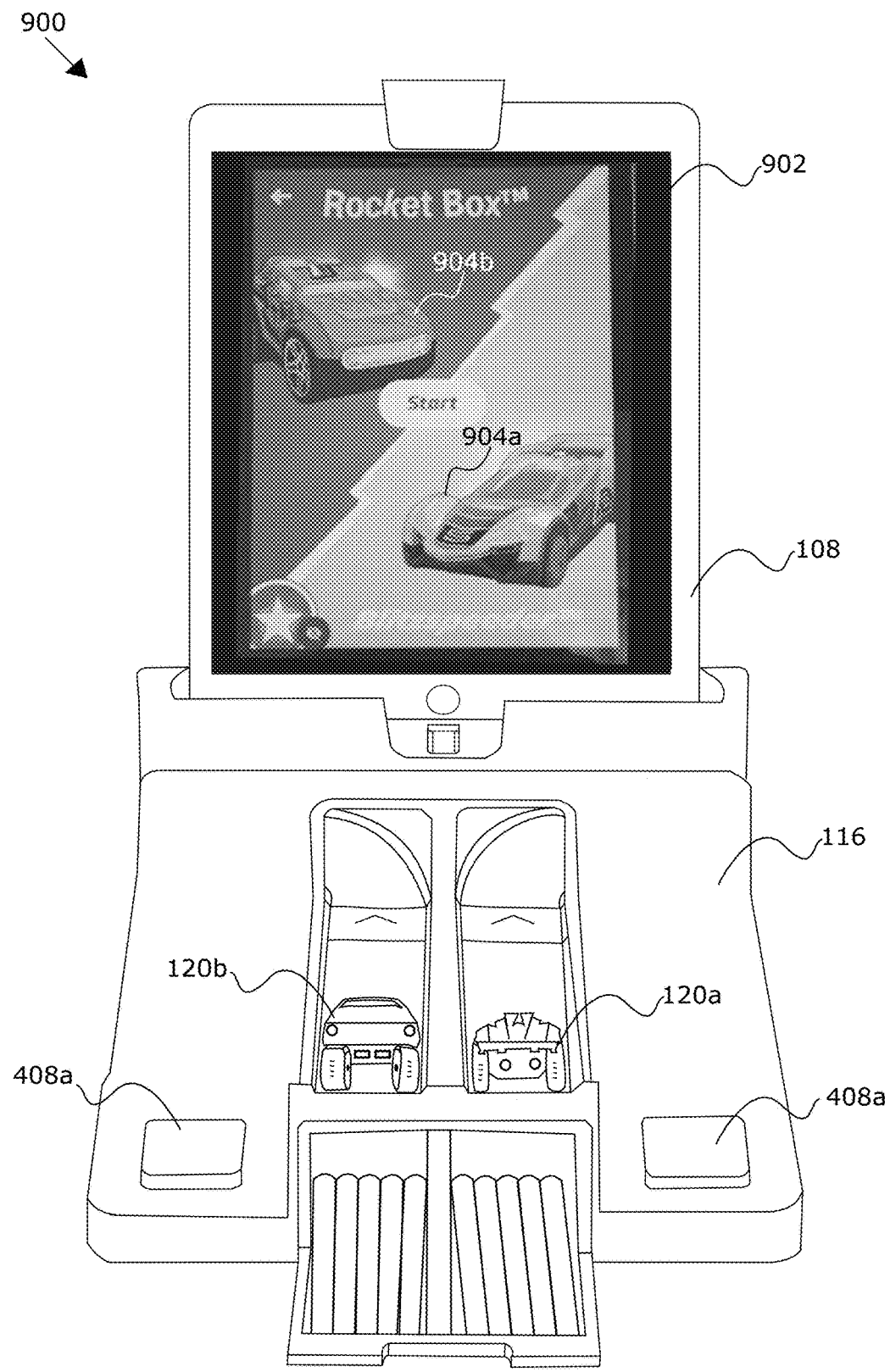

FIG. 9 is an example of a graphical representation of a GUI 900 displaying an object visualization 902 and an interaction platform 116. In some implementations, the activity application(s) 214 may cause the display screen to display an object visualization 902 that includes an object representation 904 related to the physical vehicle 120 captured by the detection engine 212. The object representation 904 may be a graphical depiction of the physical vehicle 120 placed on the track 118 of the interaction platform 116. For example users may place two different physical vehicle(s) 120a and 120b onto the track 118 of the interaction platform 116. The detection engine 212 may process the video stream to identify the physical vehicle(s) 120a and 120b. The activity application(s) 214 may then retrieve the object representations 904a and 904b from a database of vehicle profiles using the identities of the physical vehicle(s) 120a and 120b. In some implementations, the activity application(s) 214 may create the object representations 904 based on an image of the physical vehicle 120 extracted from the video stream.

Figure 10A:
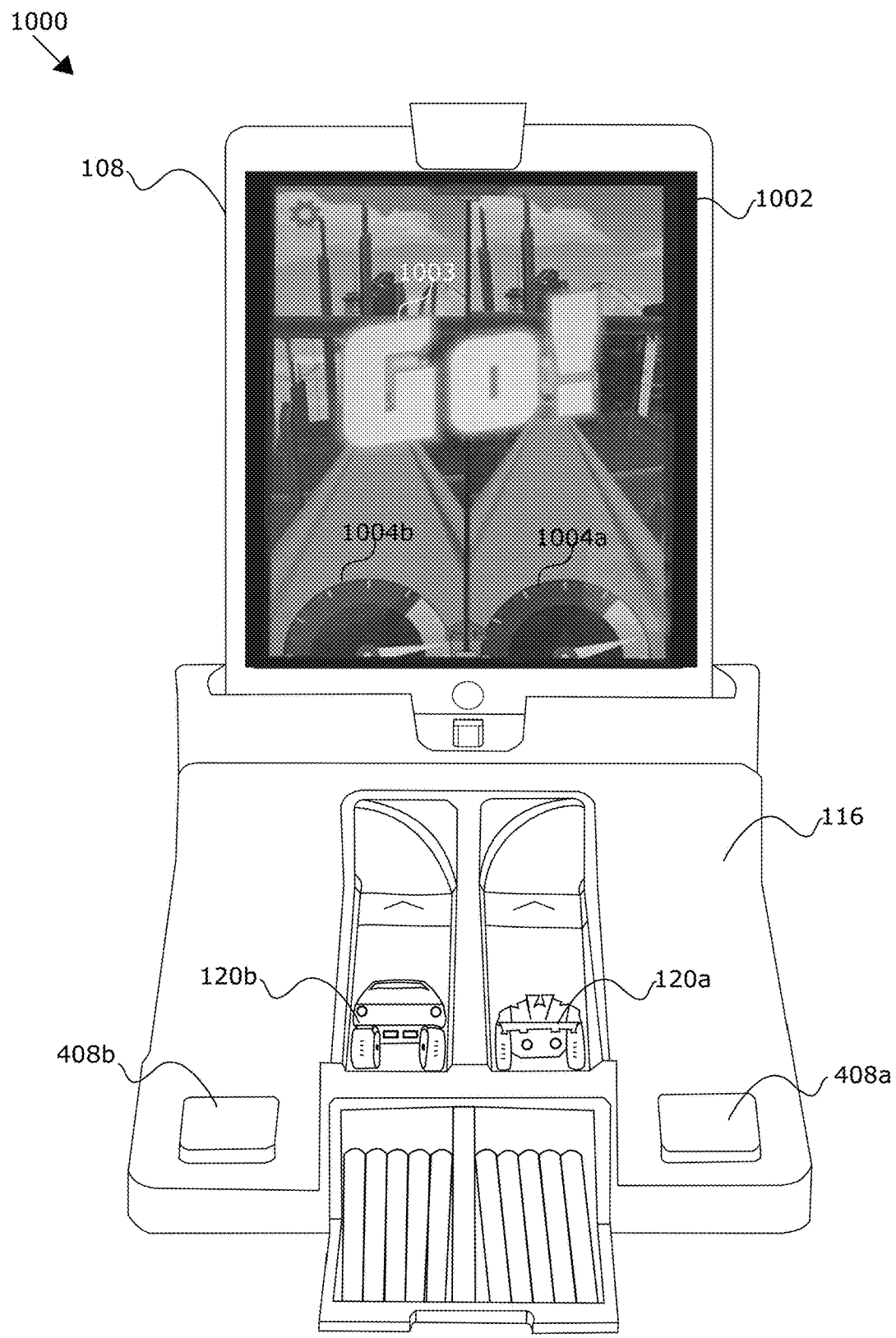

FIG. 10A is an example of a graphical representation of an example GUI 1000 displaying a start visualization 1002 and an interaction platform 116. In some implementations, the activity application(s) 214 may cause the display screen to display a start visualization 1002. In some implementations, the activity application(s) 214 may cause the start visualization 1002 to be displayed in response to the detection engine determining that one or more physical vehicle(s) 120 have been positioned in starting portions. In further implementations, the activity application(s) 214 may cause the start visualization 1002 to be displayed responsive to receiving an input selecting to start the virtual game.

Figure 10B:
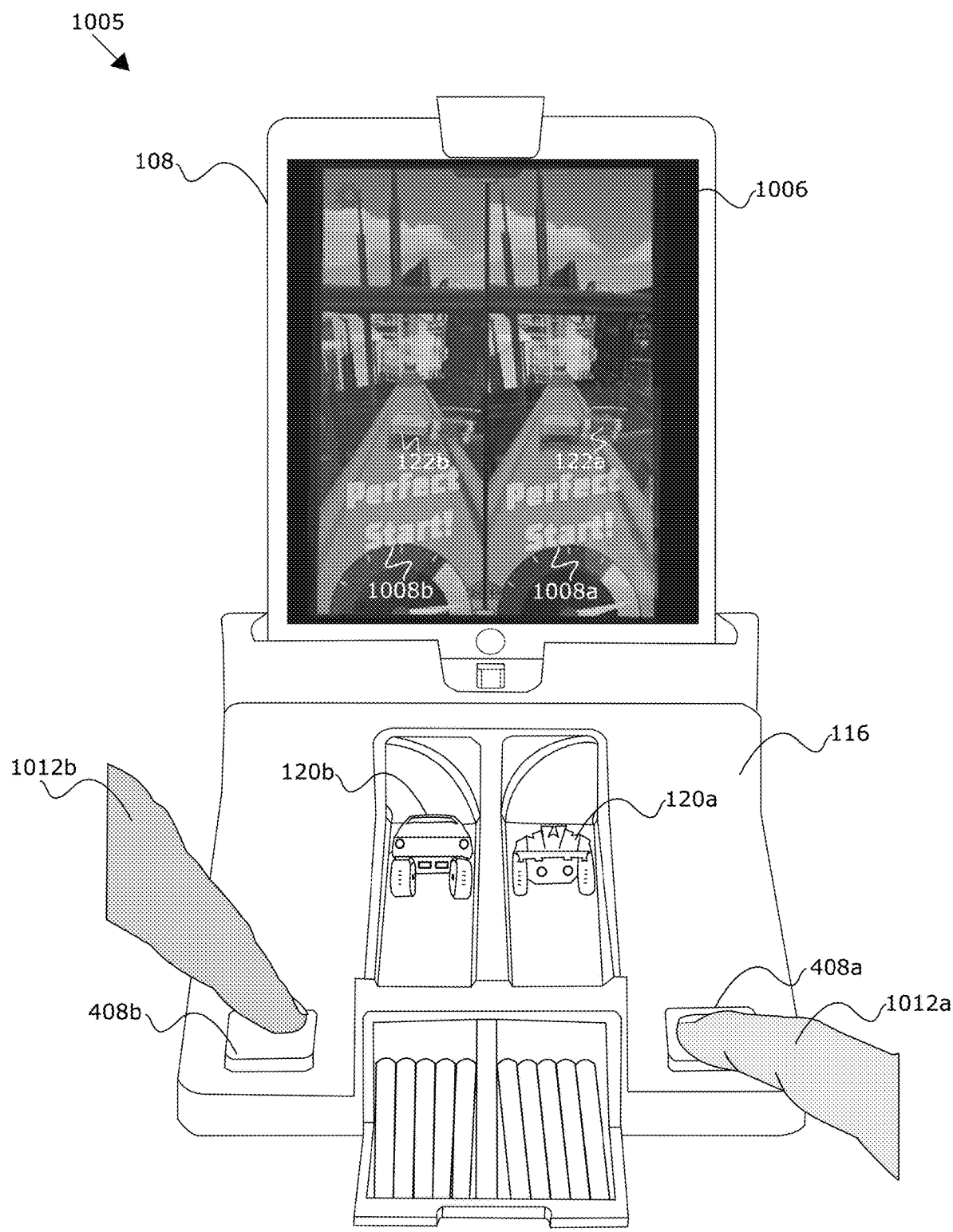

The start visualization 1002 may include a starting prompt 1003 on the display screen, indicating to one or more users when to release the physical vehicle(s) 120. For example, the starting prompt 1003 may include a "Get Ready" and/or text displayed on the display screen. In further examples, the starting prompt may then count down from "3-2-1" and then display a "GO" prompt as shown indicating when the user can release the physical vehicle(s) 120. In some implementations the starting visualization 1002 may be predictable and one or more users may be able to countdown with the starting prompt and predict the moment when the physical vehicle(s) 120 can be released in order to get a "perfect start" as shown in FIG. 10B. In further implementations, the starting visualization 1002 may be randomized and a user may not be able to predict exactly when to release the physical vehicle(s) 120. For example, the starting prompt may include a traffic light that includes a red light and a green light. When the red light is lit up, a user should not release the physical vehicle(s) 120 or they may incur a penalty, however when the traffic light switches and the green light is lit up, the user can time the release of the physical vehicle(s) 120 to the moment that the traffic light switches. By randomizing the starting prompt, users can engage with the start visualization 1002 and react to a virtual change by engaging with the interaction platform 116 based on the start virtualization 1002.

In some implementations, the start visualization 1002 may include one or more meter visualization(s) 1004. For example, the meter visualization(s) 1004 may represent a tachometer and as a user's hand approaches and/or presses on the trigger 408 the indicator on the meter visualization(s) 1004 may increase similar to how the revolutions per minute ("RPMs") in a car increase as a gas pedal is pressed. In further examples, an engine revving sound may accompany the increase in the indicators on the meter visualization(s) 1004 as described elsewhere herein.

FIG. 10B is an example of a graphical representation of an example GUI 1005 displaying an example starting screen and the interaction platform 116. In some implementations, the activity application(s) 214 may cause the display screen to display a first example starting screen 1006 of the virtual game. The first example starting screen 1006 depicts a first virtual vehicle representation 122a representing a first physical vehicle 120a on a first track visualization and a second virtual vehicle representation 122b representing a second physical vehicle 120b on a second track visualization. A first user and a second user may separately press triggers to release their respective first physical vehicle 120a and second physical vehicle 120b. As described elsewhere herein, the detection engine 212 may analyze the video stream and identify when each of the physical vehicles 120a and 120b are released and begin moving down the track 118.

In some implementations, the detection engine 212 may compare when each physical vehicle 120a and 120b is released relative to a countdown timer (such as the start visualization 1002 described with respect to FIG. 10A) and may provide the timing of each physical vehicle 120a and 120b to the activity application(s) 214. The activity application(s) 214 may determine if each release of the physical vehicle 120a and 120b happened within a release period for a perfect start. The release period for the perfect start may be a small window of time starting when the start visualization 1002 indicates that the physical vehicles 120a and 120b can be released. For example, based on the detection and processing capabilities of the computing device 108, the release period may be half of a second in some implementations, while other time periods are also contemplated.

Based on the activity application(s) 214 determining that one or more of the physical vehicles 120a and 120b were released during the release period, the activity application(s) 214 may cause the a "perfect start" visualization 1008 to be displayed on the respective digital track visualization. In the first example starting screen 1006, the activity application(s) 214 caused the "perfect start" visualization 1008 to be displayed for both virtual vehicle representations 122 responsive to the activity application(s) 214 determining that both physical vehicles 120a and 120b were released during the release period. In some implementations, along with displaying the "perfect start" visualization 1008 that signals to the user that their release was within the release period, the activity application(s) 214 may also cause the virtual game to execute a benefit to the virtual vehicle representations 122a and 122b that executed the "perfect start". For example, the benefit may be a speed boost in the virtual game, rewarding an additional boost, action, and/or weapon into the inventory of the user, adding a negative effect to the other virtual vehicle representation 122, etc.

Figure 10C:
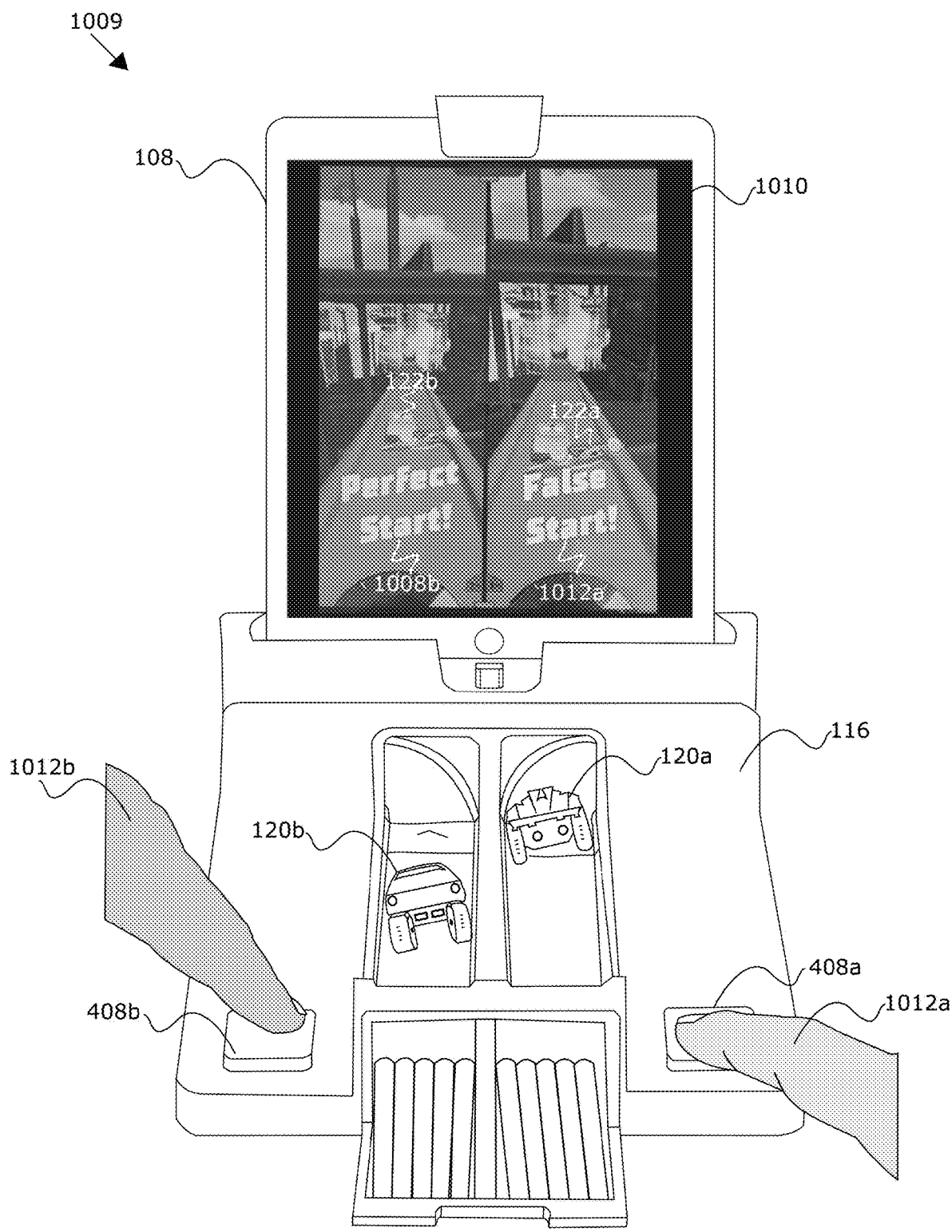

FIG. 10C depicts a graphical representation of an example GUI 1009 displaying an second example starting screen 1010 and the interaction platform 116. In some implementations, the activity application(s) 214 may cause the display screen to display the second example starting screen 1010 of the virtual game. The second example starting screen 1010 of the virtual game illustrates an example "false start" visualization 1012a. Similar to the "perfect start" displayed in response to a user releasing the physical vehicle 120 within the release period as described with respect to FIG. 10B, the "false start" visualization 1012a may be displayed when the activity application(s) 214 determines that a user releases the car prior to and/or after the release period. For example, the user of physical vehicle 120a may release the physical vehicle 120a prior to the end of a countdown. The detection engine 212 may provide the detected information related to the physical vehicle 120a being released early to the activity application(s) 214 and the activity application(s) 214 may cause the "false start" visualization 1012a (or a similar indication to the user, such as the virtual vehicle representation 122a crashing and/or rolling) to be displayed that signals to the user that the release was early and/or late. In further implementations, the activity application(s) 214 may also cause the virtual vehicle representation 122a related to the physical vehicle 120a that was released prior to and/or after the release period to be displayed as moving slower relative to the other virtual vehicle representation 122b that represented a "perfect start".

Figure 11:
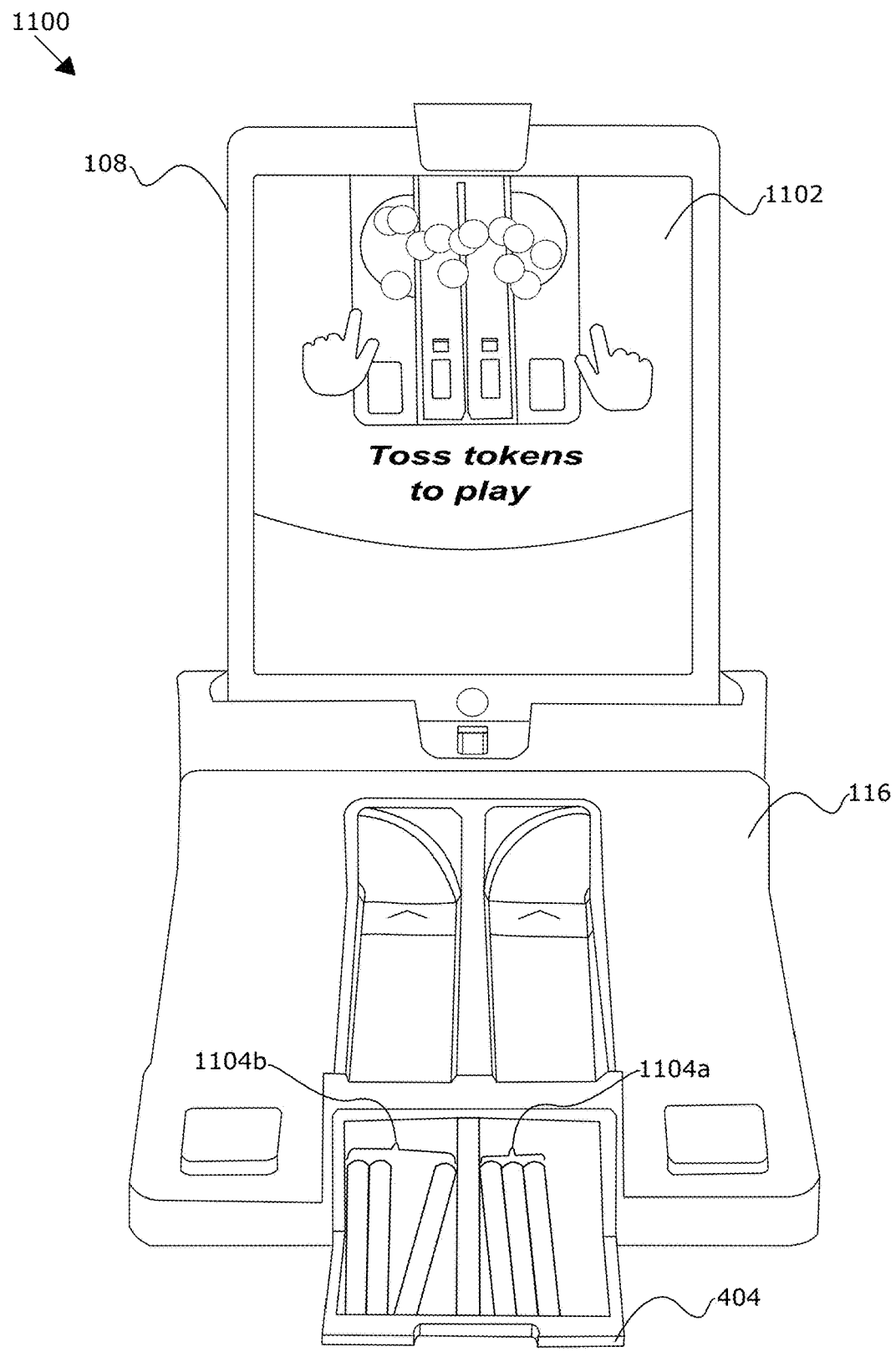

FIG. 11 depicts a graphical representation of an example GUI 1100 displaying a token instruction screen 1102 and a interaction platform 116 including a container 404. In some implementations, the activity application(s) 214 may cause the display screen to display the token instruction screen 1102. In some implementations, the activity application(s) 214 may cause the token instruction screen 1102 to display at the beginning of a virtual game and/or during the virtual game when a user should play tokens 1104 to incur the benefit of the token 126.

In further implementations, the token instructions screen 1102 may be displayed in response to the detection engine 212 detecting specific criteria, such as a new user that has not played and/or registered with the game before, tokens not being played in a previous and/or current game, one or more users switching with alternative users to play a new game, etc. The detection engine 212 may detect these specific criteria by identifying characteristics within the video stream, such as comparing hand and/or facial analysis, identifying login information, etc. In these situations, the detection engine 212 may store the characteristics that could identify a user, such as facial and/or hand characteristics locally on the computing device 108 and may have additional features in place to protect a user's privacy.

In some implementations, the interaction platform 116 may include a container 404 (as described with respect to FIG. 4). The container 404 may be configured to fold open and/or closed within the interaction platform 116 in order to increase storage and portability of the interaction platform. In some implementations, the container 404 may include a cutout portion where circular tokens 1104 may be stored as shown in FIG. 11. While circular tokens 1104 are shown, it should be understood that any other variation of token 126 as described elsewhere herein is also contemplated. The circular tokens 1104 may be a specific example of the token 126 described elsewhere herein and any functionality described specifically with circular tokens 1104 may also be used to describe tokens 126. Furthermore, other shapes and styles of tokens 126 are known and contemplated. The circular tokens 1104 represent actions that a user may cause to happen within the virtual game. The circular tokens 1104 may include graphics and ornamentation that represent the various actions.

In some implementations, the circular tokens 1104 may be stored within the container and the design of the container 404 allows the circular tokens 1104 to be easily accessed by a user. In some implementations, the circular tokens 1104 may be different colors or have alternative characteristics the separate the tokens and provide for the detection engine 212 to determine the characteristics from the video stream. For example a first user may use a set of blue circular tokens 1104a and a second user may use a set of red circular tokens 1104b, although other configurations and/or colors are also contemplated. In some implementations, the container 404 may include a portion that divides the storage space of the circular tokens 1104 to allow a first player to use a first set of tokens 1104a and a second user to use a second set of tokens 1104b.

Figure 12:
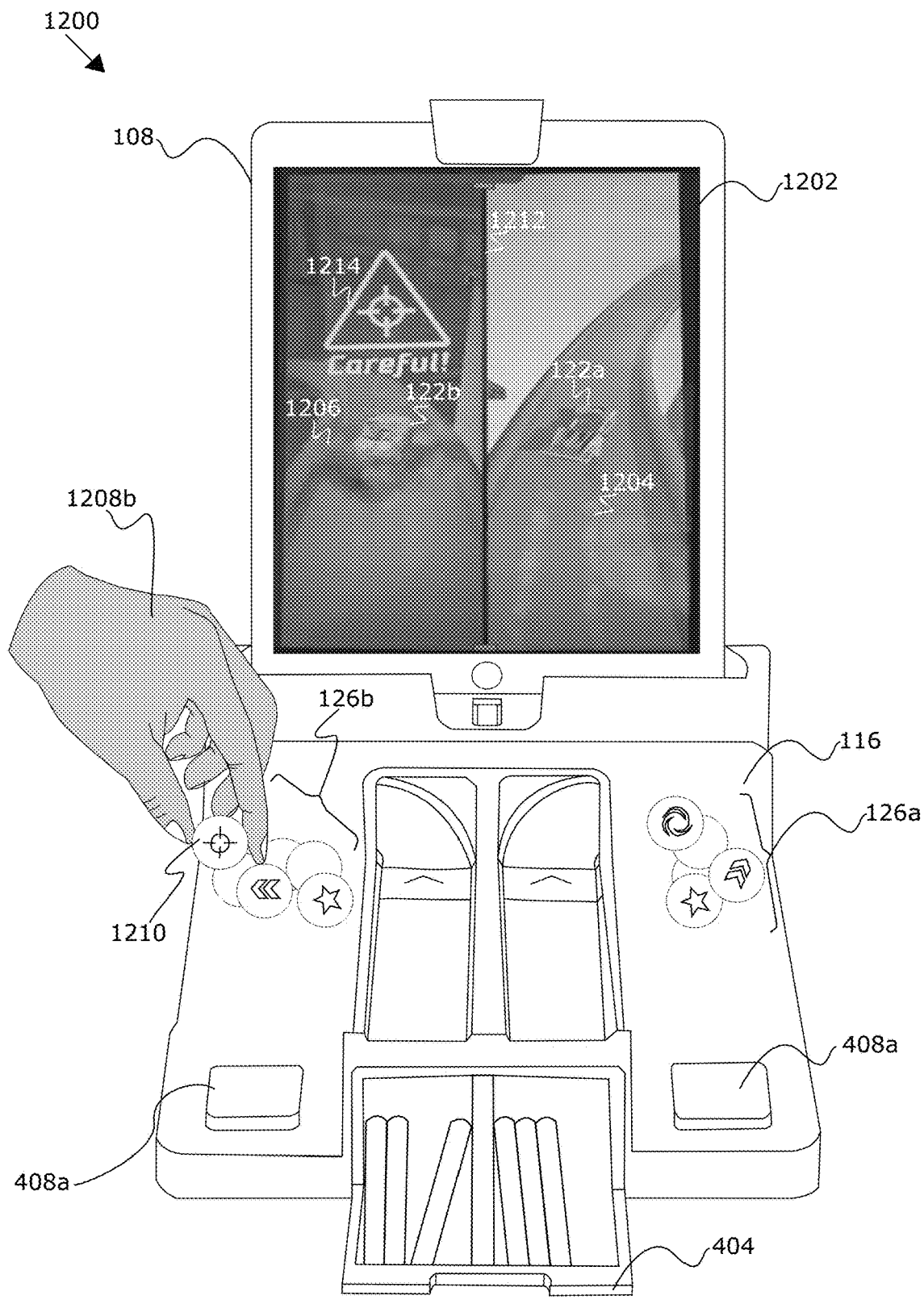

FIG. 12 depicts an example interaction platform 116 and an example GUI 1200 displaying an example action screen 1202. The example action screen 1202 depicts the first virtual vehicle representation 122a performing a boost action 1204 and a second virtual vehicle representation 122b performing a spin action 1206. The activity application(s) 214 causes the boost action 1204 and the spin action 1206 to be displayed responsive to the detection engine 212 identifying one or more tokens 126, such as the spin token 1210 representing the action or other tokens 126 represent the respective actions. For example, if the spin token 1210 is placed in the pile of tokens 126b, the detection engine 212 may identify the spin token 1210 and the activity application(s) 214 may cause the action screen 1202 to display the spin action 1206 relative to the virtual vehicle representation 122*b* associated with that spin token 1210.

The tokens 126 may be associated with specific virtual vehicle representations 122. For example, if a second user places a token 126, the detection engine 212 may identify that the token 126 was placed by the second user using various processes including by identifying a characteristic of the token 126, detecting a hand of the user that placed the token 126, detecting where the token 126 was placed, etc. The activity application(s) 214 may then use the information associated with token 126 to cause an action to appear on the action screen 1202 associated with the virtual vehicle representation 122.

The action screen 1202 may include visual effects associated with the actions to signal to a user that the action has occurred. For example, the boost action 1204 may appear to speed up the virtual vehicle representation 122*a* and/or display boosting visualization that appear as lines or effects showing the increased speed. An another example, the spin action 1206 may include a visualization that causes the virtual vehicle representation 122*b* to show a spin and/or additional visualizations appearing as lines under the virtual vehicle representation 122*b*. Other actions are contemplated and described elsewhere herein that may be displayed in response to a user placing a token 126 including an attack action, a jump action, a slow action, a dodge action, etc.

In some implementations, one or more tokens 126 may be customizable and a user may select and/or program specific actions and the activity application(s) 214 may cause the specific action and visualizations to be displayed responsive to the user playing the customizable token 126. In some implementations, each token 126 includes unique markings, allowing that token to be used only once in a virtual game, regardless of whether a user removes it from the interaction area 410 and adds it again at a later time in the virtual game. The activity application(s) 214 may track the use of the unique tokens 126 during the virtual game and recognize when the unique tokens 126 have already been used.

The action screen 1202 may also include a visual warning 1214 that prompts a user to place a specific token. For example, the visual warning 1214 represents that an attack has been played and prompts the user to counter the attack by placing a specific token 126 to counter the attack within a period of time. For example, if the user does not place a dodge token (not shown) in response to the visual warning 1214, then the virtual vehicle representation 122*b* may spin out or crash as a result of the attack played by the other user. Other examples of visual warning's 1214 may include signals to play a boost, to obscure the screen of the other user, to counter an action by the other user, to response to an event within the virtual game, etc. The action of displaying the visual warning 1214 allows a user to be more fully invested in the virtual game and strategize as to when to play specific tokens 126 in response to the virtual warning 1214.

Figure 13:
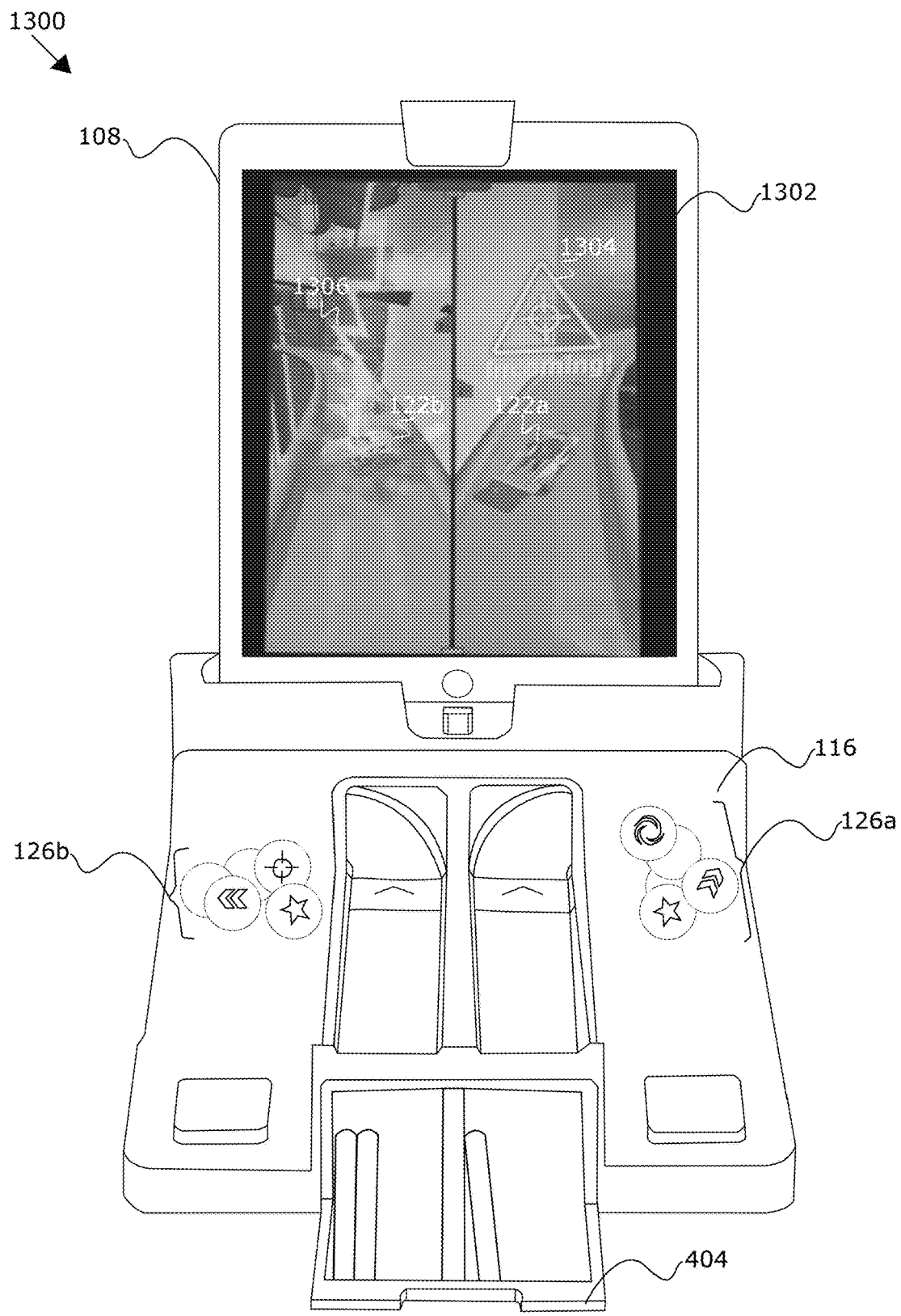

FIG. 13 depicts an example interaction platform 116 and another example GUI 1300 displaying an example prompt screen 1302. In some implementations, the example prompt screen 1302 displays an event to a user and if the user responds to the event appropriately, the event can be countered. For example, as shown, the event is a visual warning visualization 1304 indicating to the user that if a counter attack token 126 is played, then the user will counter an event that the other user initiated. In another example, an attack action visualization 1306 shows an example of the result if a user does not play a token 126 and/or performs an additional action as a result of a previous visual warning visualization (such as that shown at 1214 in FIG. 12). The attack action visualization 1306 shows an example result where the virtual vehicle representation 122*b* has been hit by a lightning attack and has slowed down and/or is spinning out.

In some implementations, there is a period of time starting when the event causes the activity application(s) 214 to display a prompt visualization and the period of time expires within an appropriate amount of time for the user to respond to the prompt. The activity application(s) 214 may determine whether the user responded to the prompt within the period of time and either execute a counter action and/or visualization in the display. Alternatively, if the user does not respond within the period of time, the activity application(s) 214 may allow the event to occur within the virtual game. These events displayed in the prompt screen 1302 allow the user to interact with the virtual game and control aspects of the virtual environment by placing tokens 126, additional physical objects (not shown), and/or performing gestures or actions within the field of view 140 of the camera 110 in order to interact with the game.

Figure 14:
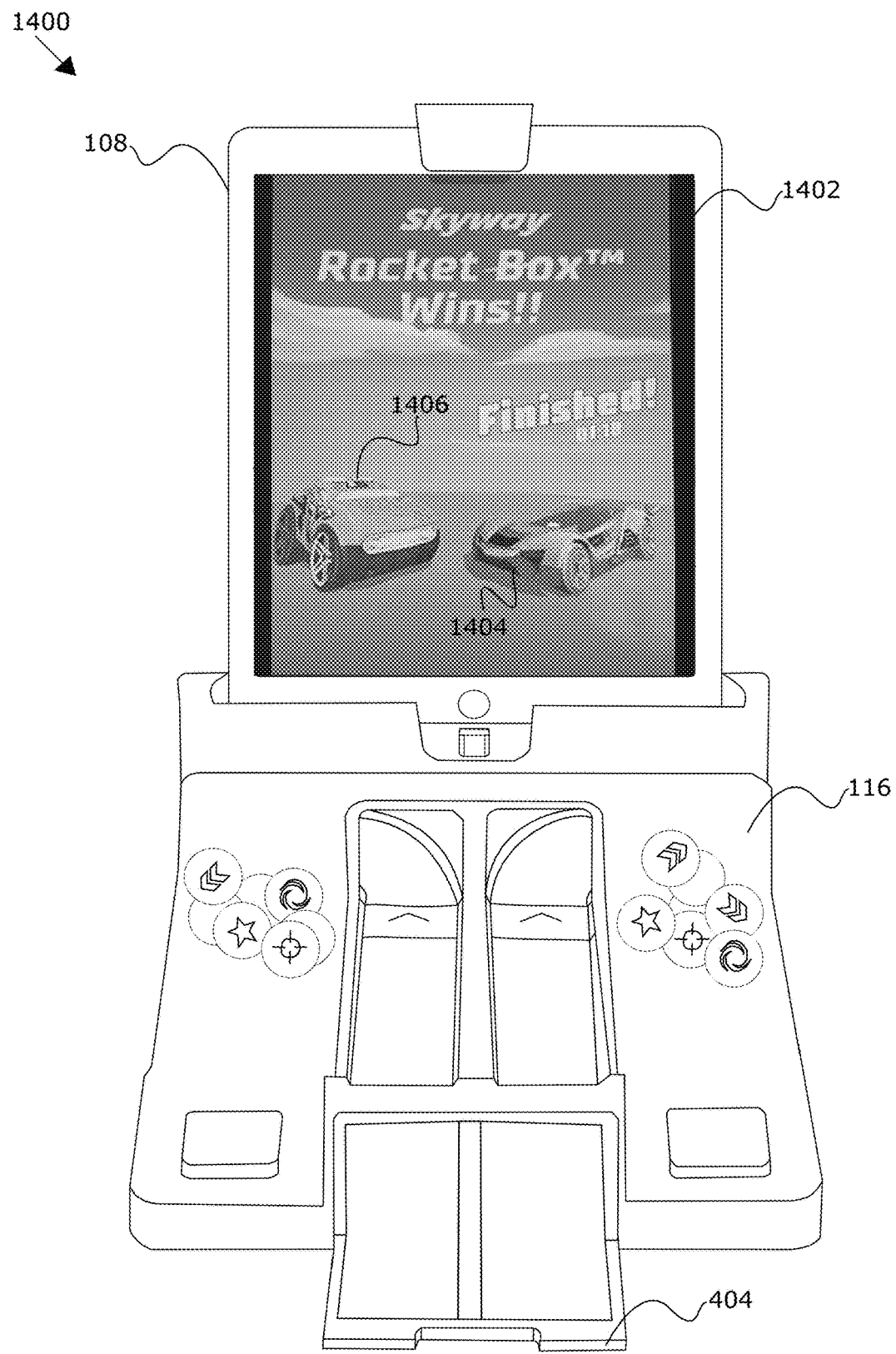

FIG. 14 depicts an example interaction platform 116 and an example GUI 1400 displaying a results screen 1402. In some implementations the virtual game may end with the results screen 1402 displaying the results of the virtual game. The results may include the performance of each virtual vehicle representation 122, statistics of the virtual game, and/or a winner visualization 1404 and a losing visualization 1406. The virtual game may end when finishing criteria occur, such as a time limit expiring, an end of a virtual race being reached, an amount of objectives being gathered and/or completed, etc. The results screen 1402 allows the users to view the summary of the virtual game and identify areas where improvement and learning can occur for a next virtual game. In some implementations, the winner visualization 1404 and/or the losing visualization 1406 include the graphical visualizations of the physical vehicle(s) 120. In further implementations, the winner visualization 1404 and/or the losing visualization 1406 may display animations reflecting the results of the virtual game.

This technology provides systems and methods for users to interact with a physical medium, such as the interaction platform 116 and/or the physical vehicle(s) 120, in order to interact with a virtual game. This technology further provides for unique digital visualizations of the physical mediums and provides users the ability to introduce additional physical components, such as tokens 126, into the virtual game, thereby allowing the user to interact with the virtual game through the physical components.

This technology yields numerous advantages including, but not limited to, providing a low-cost alternative for developing a nearly limitless range of applications that blend both physical and digital mediums by reusing existing hardware (e.g., camera) and leveraging novel lightweight detection and recognition algorithms, having low implementation costs, being compatible with existing computing device hardware, operating in real-time to provide for a rich, real-time virtual experience, processing numerous (e.g., >15, >25, >35, etc.) tangible interface object(s) simultaneously without overwhelming the computing device, recognizing tangible interface object(s) with substantially perfect recall and precision (e.g., 99% and 99.5%, respectively), being capable of adapting to lighting changes and wear and imperfections in tangible interface object(s), providing a collaborative tangible experience between users in disparate locations, being intuitive to setup and use even for young users (e.g., 3+ years old), being natural and intuitive to use, and requiring few or no constraints on the types of tangible interface object(s) that can be processed.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
capturing, using a video capture device, a video stream of a physical scene including a racing field component having a track extending from a starting portion to an end portion;
displaying, on a display, a graphical user interface embodying a virtual game;
detecting, in the video stream, a placement of a physical vehicle in the starting portion of the track of the racing field component;
identifying, using a processor of a computing device, one or more characteristics of the physical vehicle;
generating, using the processor of the computing device, a virtual vehicle representation of the physical vehicle using the one or more characteristics of the physical vehicle;
displaying, on the display of the computing device, the virtual vehicle representation of the physical vehicle;
displaying, in the graphical user interface of the virtual game, a starting prompt;
detecting a movement of the physical vehicle responsive to the starting prompt being displayed, the movement of the physical vehicle caused by a vehicle retaining mechanism releasing the physical vehicle from a starting position;
determining, using the processor of the computing device, whether the movement is within a start release period; and
executing, in the graphical user interface of the virtual game, a starting action associated with the virtual vehicle representation based on the determination of whether the movement is within the start release period.

2. The method of claim 1, further comprises:
detecting, in the video stream, a token placed in the physical scene;
identifying a virtual action based on one or more characteristics of the token; and
executing the virtual action in the virtual game.

3. The method of claim 2, wherein executing the virtual action in the virtual game includes changing a virtual movement of the virtual vehicle representation in the virtual game.

4. The method of claim 2, wherein the virtual action is one of a speed increase, a speed decrease, a lane change, a jump, and an attack.

5. The method of claim 1, further comprises:
detecting, using the processor of the computing device, a first quantity of a visual cue surface of the racing field component that is depicted in the video stream at a first time;
determining a first sound based on the first quantity of the visual cue surface of the racing field component that is depicted; and
emitting, using an audio reproduction device, the first sound.

6. The method of claim 5, further comprising:
detecting, using the processor of the computing device, a second quantity of the visual cue surface of the racing field component that is depicted in the video stream at a second time;
determining a second sound based on the second quantity of the visual cue surface of the racing field component that is depicted; and
emitting, using the audio reproduction device, the second sound.

7. The method of claim 1, wherein:
the track is a first track,
the starting portion is a first starting portion,
the end portion is a first end portion,
the placement is a first placement,
the physical vehicle is a first physical vehicle,
the virtual vehicle representation is a first virtual vehicle representation,
the video stream of the physical scene includes a second track extending from a second starting portion to a second end portion, and
the method further comprises:
detecting, in the video stream, a second placement of a second physical vehicle in the second starting portion of the second track;
identifying, using the processor of the computing device, one or more characteristics of the second physical vehicle at the second starting portion;
generating, using the processor of the computing device, a second virtual vehicle representation of the second physical vehicle using the one or more characteristics of the second physical vehicle; and
displaying, on the display of the computing device, the second virtual vehicle representation of the second physical vehicle in the graphical user interface of the virtual game, the second virtual vehicle representation displayed adjacent to the first virtual vehicle representation.

8. The method of claim 7, wherein the first physical vehicle is different from the second physical vehicle and the method further comprises:
associating, using the processor of the computing device, the first physical vehicle with a first user of the virtual game and the second physical vehicle with a second user of the virtual game.

9. The method of claim 7, wherein the movement is a first movement, the vehicle retaining mechanism is a first vehicle retaining mechanism, and the starting action is a first starting action, the method further comprising:
detecting a second movement of the second physical vehicle responsive to the starting prompt being displayed, the second movement of the second physical vehicle caused by a second vehicle retaining mechanism releasing the second physical vehicle from the second starting portion;

determining, using the processor of the computing device, whether the second movement is within the start release period; and executing, in the graphical user interface of the virtual game, a second starting action associated with the second virtual vehicle representation based on the determination of whether the second movement is within the start release period.

10. A virtualization system comprising:

a video capture device coupled to a computing device, the video capture device being adapted to capture a video stream of a physical scene that includes a racing field component having a track extending from a starting portion to an end portion;

a display coupled to the computing device and adapted to display a graphical user interface embodying a virtual game;

a detector coupled to the computing device and adapted to detect, in the video stream, a placement of a physical vehicle in the starting portion of the track of the racing field component and detect a movement of the physical vehicle responsive to a starting prompt being displayed and a vehicle retaining mechanism releasing the physical vehicle from a starting position; and a processor of the computing device, the processor being adapted to:
identify one or more characteristics of the physical vehicle;
generate a virtual vehicle representation of the physical vehicle using the one or more characteristics of the physical vehicle; display, on the display of the computing device, the virtual vehicle representation of the physical vehicle;
display, in the graphical user interface of the virtual game, the starting prompt;
determine whether the movement is within a start release period; and
execute, in the graphical user interface, a starting action associated with the virtual vehicle representation based on the determination of whether the movement is within the start release period.

11. The virtualization system of claim 10, wherein:
the detector coupled to the computing device is adapted to detect, in the video stream, a token placed in the physical scene; and
the processor of the computing device is adapted to:
identify a virtual action based on one or more characteristics of the token; and
execute the virtual action in the virtual game.

12. The virtualization system of claim 11, wherein executing the virtual action in the virtual game includes changing a virtual movement of the virtual vehicle representation in the virtual game.

13. The virtualization system of claim 11, wherein the virtual action is one of a speed increase, a speed decrease, a lane change, a jump, and an attack.

14. The virtualization system of claim 10, wherein the processor of the computing device is adapted to:
detect a first quantity of a visual cue surface of the racing field component that is depicted in the video stream at a first time;
determine a first sound based on the first quantity of the visual cue surface of the racing field component that is depicted; and
emit, using an audio reproduction device, the first sound.

15. The virtualization system of claim 14, wherein the processor of the computing device is adapted to:
detect a second quantity of the visual cue surface of the racing field component that is depicted in the video stream at a second time;
determine a second sound based on the second quantity of the visual cue surface of the racing field component that is depicted; and
emit, using the audio reproduction device, the second sound.

16. The virtualization system of claim 10, wherein:
the track is a first track,
the starting portion is a first starting portion,
the end portion is a first end portion,
the placement is a first placement,
the physical vehicle is a first physical vehicle,
the virtual vehicle representation is a first virtual vehicle representation,
the video stream of the physical scene includes a second track extending from a second starting portion to a second end portion,
the detector coupled to the computing device is adapted to detect, in the video stream, a second placement of a second physical vehicle in the second starting portion of the second track, and
the processor of the computing device is adapted to:
identify one or more characteristics of the second physical vehicle at the second starting portion;
generate a second virtual vehicle representation of the second physical vehicle using the one or more characteristics of the second physical vehicle; and
display, on the display of the computing device, the second virtual vehicle representation of the second physical vehicle in the graphical user interface of the virtual game, the second virtual vehicle representation displayed adjacent to the first virtual vehicle representation.

17. The virtualization system of claim 16, wherein the first physical vehicle is different from the second physical vehicle and the processor of the computing device is adapted to:
associate the first physical vehicle with a first user of the virtual game and the second physical vehicle with a second user of the virtual game.

18. The virtualization system of claim 16, wherein, the movement is a first movement, the vehicle retaining mechanism is a first vehicle retaining mechanism, the starting action is a first starting action, and wherein:
the detector coupled to the computing device is adapted to:
detect a second movement of the second physical vehicle responsive to the starting prompt being displayed, the second movement of the second physical vehicle caused by a second vehicle retaining mechanism releasing the second physical vehicle from the second starting portion; and
the processor of the computing device is adapted to:
determine whether the second movement is within the start release period; and
execute, in the graphical user interface of the virtual game, a second starting action associated with the second virtual vehicle representation based on the determination of whether the second movement is within the start release period.

19. A method comprising:
capturing, using a video capture device, a video stream of a physical scene including a racing field component having a track extending from a starting portion to an end portion;
displaying, on a display, a graphical user interface embodying a virtual game;
detecting, in the video stream, a placement of an object in the starting portion of the track of the racing field component;
identifying, using a processor of a computing device, one or more characteristics of the object;
generating, using the processor of the computing device, a virtual representation of the object using the one or more characteristics of the object;
displaying, on the display of the computing device, the virtual representation of the object;
displaying, on the display, a starting prompt;
detecting a movement of the object responsive to the starting prompt being displayed, the movement of the object caused by a retaining mechanism releasing the object from the starting portion;
determining, using the processor of the computing device, whether the movement is within a start release period;
executing, a starting action associated with the virtual representation based on the determination that the movement is within the start release period;
detecting, in the video stream, a token placed in the physical scene;
identifying a virtual action based on one or more characteristics of the token; and
applying the virtual action to the virtual representation of the object in the virtual game.

20. The method of claim 19, further comprising:
detecting, using the processor of the computing device, a quantity of a visual cue surface of the racing field component depicted in the video stream;
determining a sound based on the quantity of the visual cue surface; and
emitting, using an audio reproduction device, the sound.

* * * * *